(12) United States Patent
Park

(10) Patent No.: US 11,258,532 B2
(45) Date of Patent: Feb. 22, 2022

(54) METHOD AND APPARATUS FOR DATA MODULATION AND CODING FOR NEW RADIO

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/241,086

(22) Filed: Jan. 7, 2019

(65) Prior Publication Data

US 2019/0215095 A1   Jul. 11, 2019

(30) Foreign Application Priority Data

Jan. 11, 2018  (KR) .................. 10-2018-0004091
May 24, 2018  (KR) .................. 10-2018-0058965
Oct. 31, 2018  (KR) .................. 10-2018-0132306

(51) Int. Cl.
*H04L 1/00* (2006.01)
*H04W 76/11* (2018.01)
(Continued)

(52) U.S. Cl.
CPC .......... *H04L 1/0003* (2013.01); *H04L 1/0016* (2013.01); *H04L 1/0023* (2013.01);
(Continued)

(58) Field of Classification Search
CPC ... H04L 1/0003; H04L 1/0023; H04L 1/0016; H04L 1/0061; H04L 27/34; H04L 1/0036;
(Continued)

(56) References Cited

U.S. PATENT DOCUMENTS 9,407,417 B2 *  8/2016  Chen ................... H04L 1/0009
9,496,997 B2 * 11/2016  Park .................... H04B 7/024
(Continued)

FOREIGN PATENT DOCUMENTS

CN           107483160 A    12/2017
EP             3122141 A1     1/2017
KR    10-2017-0005071 A1     1/2017

OTHER PUBLICATIONS

Ericsson, "On MCS/transport Block Size Determination for PUSCH", R1-1709096, 3GPP TSG-RAN WG1 Meeting #89, Hangzhou, China, May 15-19, 2017, pp. 1-6.
Ericsson, "MCS table for URLLC", R1-1720977, 3GPP TSG-RAN WG1 Meeting #91, Reno, U.S.A., Nov. 27-Dec. 1, 2017, pp. 1-4.
MCC Support, "Final Report of 3GPP TSG RAN WG1 #84bis v1.0.0", R1-165448, 3GPP TSG RAN WG1 Meeting #85, Nanjing, China, May 23-27, 2016, pp. 1-160.
(Continued)

*Primary Examiner* — Nishant Divecha
(74) *Attorney, Agent, or Firm* — Invenstone Patent, LLC

(57) ABSTRACT

Provided is a method of transmitting scheduling control information on a physical uplink shared channel by a base station. The method includes transmitting control information indicating a specific modulation and coding scheme (MCS) index corresponding to modulation and coding scheme (MCS) information to be applied to the physical uplink shared channel through a physical downlink control channel, and receiving the physical uplink shared channel modulated based on specific MCS information determined using one of two or more MCS tables containing the specific MCS index and modulation order information corresponding to at least the MCS index.

11 Claims, 14 Drawing Sheets

(51) Int. Cl.
*H04W 72/04* (2009.01)
*H04W 4/70* (2018.01)
*H04L 5/00* (2006.01)
*H04L 27/34* (2006.01)

(52) U.S. Cl.
CPC ............. *H04L 1/0061* (2013.01); *H04W 4/70* (2018.02); *H04W 72/042* (2013.01); *H04W 72/0446* (2013.01); *H04W 72/0453* (2013.01); *H04W 76/11* (2018.02); *H04L 1/0036* (2013.01); *H04L 5/001* (2013.01); *H04L 5/0007* (2013.01); *H04L 5/0055* (2013.01); *H04L 27/34* (2013.01)

(58) Field of Classification Search
CPC ..... H04L 5/0055; H04L 5/0007; H04L 5/001; H04L 27/2601; H04L 5/0092; H04W 72/042; H04W 4/70; H04W 72/0453; H04W 72/0446; H04W 76/11
See application file for complete search history.

(56) References Cited

U.S. PATENT DOCUMENTS

| | | | |
|---|---|---|---|
| 10,050,819 B2* | 8/2018 | Chen | H04L 67/04 |
| 2012/0002657 A1* | 1/2012 | Seyama | H04L 1/1628 370/338 |
| 2017/0070374 A1 | 3/2017 | Nakamura et al. | |
| 2017/0171014 A1 | 6/2017 | Chen et al. | |
| 2019/0158230 A1* | 5/2019 | Chen | H04L 1/0057 |

OTHER PUBLICATIONS

Huawei et al., "Resource allocation and TBS", R1-1715427, 3GPP TSG RAN WG1 Meeting NR#3, Nagoya, Japan, Sep. 18-21, 2017, pp. 1-11.

European Patent Office, European Search Report of corresponding EP Patent Application No. 19150559.3, dated Jun. 18, 2019.

A Chinese Office Action dated Nov. 4, 2021 in connection with Chinese Patent Application No. 201910011509.9 which corresponds to the above-referenced U.S. application.

* cited by examiner

METHOD AND APPARATUS FOR DATA MODULATION AND CODING FOR NEW RADIO

CROSS REFERENCE TO RELATED APPLICATION

This application claims priority from Korean Patent Applications No. 10-2018-004091, filed on Jan. 11, 2018, No. 10-2018-0058965, filed on May 24, 2018, & No. 10-2018-0132306, filed on Oct. 31, 2018 which are hereby incorporated by reference for all purposes as if fully set forth herein.

BACKGROUND

1. Technical Field

The present disclosure relates to methods and apparatuses for transmitting and/or receiving control information through a physical data channel in a next-generation/5G radio access network (hereinafter, referred to as a new radio (NR)).

More specifically, the present disclosure proposes methods of data modulation and coding for satisfying requirements of reliability for ultra reliable and low latency communications (URLLC) data.

2. Description of the Related Art

Recently, the 3rd generation partnership project (3GPP) has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for the new radio (NR). The NR is required to be designed not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design frame structures to be more flexible, compared with the LTE/LTE-Advanced.

Particularly, there is an increasing need for a specific and efficient method of defining a separate modulation and coding scheme (MCS) table for each target block error rate (BLER) in the NR.

SUMMARY

To address such issues, at least one object of the present disclosure is to provide methods and apparatuses for defining a separate MCS table for each target BLER in the NR.

In accordance with an aspect of the present disclosure, a method of a base station is provided for transmitting scheduling control information on a physical uplink shared channel.

The method of the base station includes transmitting control information indicating a specific modulation and coding scheme (MCS) index corresponding to modulation and coding scheme (MCS) information to be applied to a physical uplink shared channel through a physical downlink control channel, and determining specific MCS information used for the physical uplink shared channel using the specific MCS index and one of two or more MCS tables containing modulation order information and target code rate corresponding to at least the specific MCS index.

In accordance with another aspect of the present disclosure, a method of a user equipment is provided for receiving scheduling control information on a physical data channel.

The method of the user equipment includes receiving control information indicating a specific modulation and coding scheme (MCS) index corresponding to modulation and coding scheme (MCS) information to be applied to a physical data channel through a physical downlink control channel, and determining specific MCS information used for the physical data channel using the specific MCS index and one of two or more MCS tables containing modulation order information and target code rate corresponding to the specific MCS index.

In accordance with another aspect of the present disclosure, a base station is provided for transmitting scheduling control information on a physical uplink shared channel.

The base station includes a transmitter configured to transmit control information indicating a specific modulation and coding scheme (MCS) index corresponding to modulation and coding scheme (MCS) information to be applied to a physical uplink shared channel through a physical downlink control channel, and a receiver configured to receive the physical uplink shared channel modulated based on specific MCS information determined using the specific MCS index and one of two or more MCS tables containing modulation order information and target code rate corresponding to the specific MCS index.

In accordance with another aspect of the present disclosure, a user equipment is provided for receiving scheduling control information on a physical data channel.

The user equipment includes a receiver configured to receive control information indicating a specific modulation and coding scheme (MCS) index corresponding to modulation and coding scheme (MCS) information to be applied to a physical data channel through a physical downlink control channel, and a controller configured to determine specific MCS information used for the physical data channel using the specific MCS index and one of two or more MCS tables containing modulation order information and target code rate corresponding to the specific MCS index.

In accordance with embodiments of the present disclosure, it is possible to define a separate MCS table for each target BLER in the NR.

DETAILED DESCRIPTION

Figure 1:
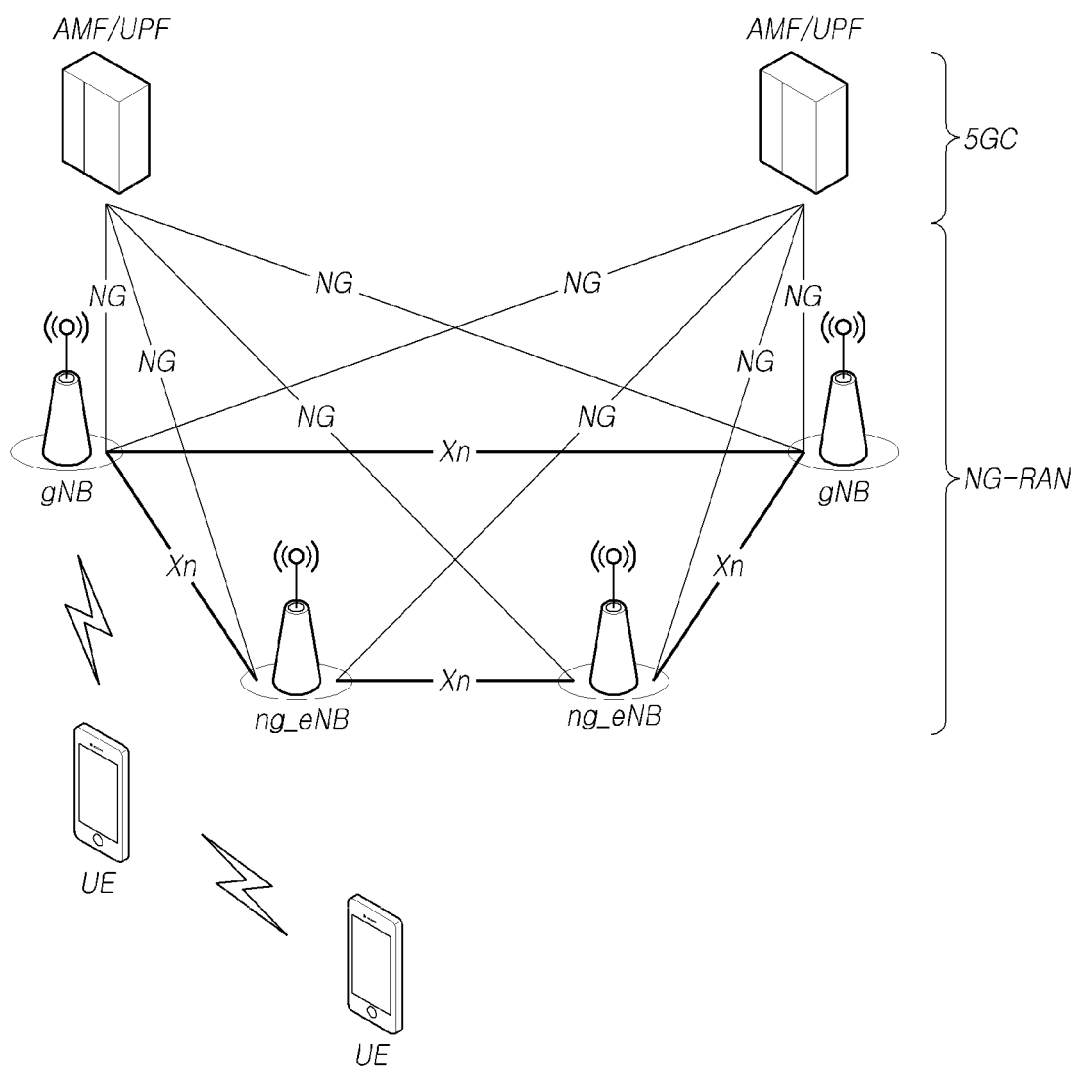
FIG. 1 is a diagram schematically illustrating a structure of a NR wireless communication system.

Hereinafter, embodiments of the present disclosure will be described in detail with reference to the accompanying drawings. In denoting elements of the drawings by reference numerals, the same elements will be referenced by the same reference numerals although the elements are illustrated in different drawings. In the following description of the present disclosure, a detailed description of known functions and configurations incorporated herein will be omitted when it is determined that the description may make the subject matter of the present disclosure rather unclear.

Terms, such as first, second, A, B, (a), or (b) may be used herein to describe elements of the disclosure. Each of the terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element.

In addition, terms and technical names used herein are for the purpose of describing specific embodiments, and technical spirit of the present disclosure is not limited to the corresponding terms. Unless defined otherwise, the terms described below may be construed in a manner normally understood by any person skilled in the art to which the present disclosure pertains. In a case where a corresponding term is a misleading technical term that does not precisely embody the technical spirit of the present disclosure, it should be understood that the term is replaced by a technical term that can be correctly understood by any person skilled in the art. Further, the terms used in the present disclosure should be construed as according to definitions in dictionaries or context, and should not be construed as being excessively reduced in meaning.

In the present disclosure, the wireless communication systems refer to systems for providing various communication services using radio resources, such as a voice service, a data packet service, etc., and may include a user equipment, a base station, and a core network.

Preferred embodiments described below may be applied to wireless communication systems using various radio access technologies. For example, embodiments of the present disclosure may be applied to various multiple access techniques, such as code division multiple access (CDMA), frequency division multiple access (FDMA), time division multiple access (TDMA), orthogonal frequency division multiple access (OFDMA), singlecarrier frequency division multiple access (SC-FDMA), or the like. The CDMA may be implemented with radio technologies, such as universal terrestrial radio access (UTRA) or CDMA2000. The TDMA may be implemented with radio technologies, such as global system for mobile communications (GSM), general packet radio service (GPRS), enhanced datarates for GSM evolution (EDGE). The OFDMA may be implemented with radio technologies, such as institute of electrical and electronics engineers (IEEE) 802.11 (Wi-Fi), IEEE 802.16 (WiMAX), IEEE 802-20, evolved UTRA (E-UTRA), or the like. The IEEE 802.16m is an evolution of IEEE 802.16e and provides backward compatibility with systems based on IEEE 802.16e. The UTRA is a part of the universal mobile telecommunications system (UMTS). 3rd generation partnership project (3GPP) long term evolution (LTE) is a part of E-UMTS (evolved UMTS) using evolved-UMTS terrestrial radio access (E-UTRA), and uses the OFDMA in downlink and the SC-FDMA in uplink. As described above, embodiments of the present disclosure may be applied to radio access technologies that are currently being launched or commercialized, or that are being developed or developed in the future.

Meanwhile, in the present disclosure, a user equipment is defined as a generic term meaning a device including a wireless communication module performing communications with a base station in a wireless communication system. The user equipment shall be construed as including, but not limited to, all of devices, such as, as well as a user equipment (UE) supporting wideband code division multiple access (WCDMA), LTE, high speed packet access (HSPA), international mobile telecommunications (IMT)-2020 (5G or new radio), or the like, a mobile station (MS) supporting the GSM, a user terminal (UT), a subscriber station (SS), a wireless device, or the like. In addition, the UE may be a portable device such as a smart phone according to a type of usage, and may denote a vehicle, a device including a wireless communication module in the vehicle, or the like, in a V2X communication system. In addition, in the case of a machine type communication (MTC) system, the UE may denote a MTC terminal, an M2M terminal, or the like, on which a communication module enabling machine type communication to be performed is mounted.

In the present disclosure, a base station or a cell generally refers to a station communicating with the UE. The base station or cell is defined as a generic term including, but not limited to, all of various coverage areas, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), a small cell, or the like.

The various cells described above is controlled by a base station, therefore the base station may be classified into two categories. 1) The base station may be referred to an apparatus that provides a megacell, a macrocell, a microcell, a picocell, a femtocell, and a small cell, in association with a radio area, or 2) the base station may be referred to a radio area itself. In case of 1) the base station may be referred to all apparatuses providing any radio area i) by being controlled by the same entity or ii) by cooperating with one another. A point, a transmission/reception point, a transmission point, a reception point, and the like may be examples of the base station according to methods of configuring the radio area. In case of 2) the base station may be a radio area itself for enabling a UE or a base station for receiving a signal from or transmitting a signal to another UE or a neighboring base station perspective.

In the present disclosure, the cell may refer to a coverage of a signal transmitted from a transmission/reception point, a component carrier having the coverage of a signal transmitted from a transmission point or a transmission/reception point, or a transmission/reception point itself.

Uplink (UL) refers to data transmission and reception from a UE to a base station, and downlink (DL) refers to data transmission and reception from a base station to a UE. The DL may denote communication or a communication path from multiple transmission/reception points to a UE, and the UL may denote communication or a communication path from the UE to the multiple transmission/reception points. At this time, in the DL, a transmitter may be a part of multiple transmission/reception points, and a receiver may be a part of a UE. In the UL, a transmitter may be a part of a UE and a receiver may be a part of multiple transmission/reception points.

The UL and the DL i) transmit/receive control information through one or more control channels, such as a physical DL control channel (PDCCH), a physical UL control channel (PUCCH), and the like and ii) transmit/receive data through one or more data channels, such as a physical DL shared channel (PDSCH), a physical UL shared channel (PUSCH), and the like. Hereinafter, the transmission/reception of a signal through the PUCCH, the PUSCH, the PDCCH, or the PDSCH, may be described as the transmission/reception of the PUCCH, the PUSCH, the PDCCH, or the PDSCH.

Hereinafter, to describe clearly embodiments of the present disclosure, description will be given based on the 3GPP LTE/LTE-A/NR (New RAT) communication systems, but is not limited thereto.

After 4th-generation (4G) communication technology has been developed, studies on 5th-generation (5G) communication technology are in progress in the 3GPP, in order to meet requirements for next generation radio access technology under the ITU-R. Specifically, in the 3GPP, studies on a new NR communication technology are in progress independent of 4G communication technology and LTE-A pro having improved LTE-Advanced technology according to requirements of the ITU-R to reach 5G communication technology. It is assumed that both the LTE-A pro and the NR will be introduced into 5G communication technology, for convenience of description, embodiments of the present disclosure will be described mainly with reference to the NR.

Various operation scenarios of the NR are defined by adding scenarios for a satellite, a vehicle, a new vertical, and the like, in typical 4G LTE scenarios. In terms of services, the NR supports an enhanced mobile broadband (eMBB) scenario, a massive machine communication (MMTC) scenario in which i) the density of UEs is high, ii) corresponding deployment is performed over a wide range, and iii) low data rate and asynchronous access are required, and an Ultra Reliability and Low Latency (URLLC) scenario in which high responsiveness and reliability are required and high-speed mobility can be supported.

To satisfy such scenarios, the NR specifies wireless communication systems to which at least one of a new waveform and frame structure technique, a low latency technique, a millimeter-wave (mmWave) support technique and a forward compatible providing technique is applied. In particular, in order to provide forward compatibility, various technological changes in terms of flexibility have been introduced into NR systems. Main technical features of the present disclosure are described below with reference to the drawings.

<General NR System>

FIG. 1 is a diagram schematically illustrating a structure of a NR system.

Referring to FIG. 1, the NR system is divided into a 5G Core Network (5GC) and an NR-RAN part. The NG-RAN includes a gNB and an ng-eNB, which provide user plane (SDAP/PDCP/RLC/MAC/PHY) and control plane (RRC) protocol terminations toward a user equipment (UE). Interconnection between gNBs or between the gNB and the ng-eNB is performed through a XNA interface. Each of the gNB and the ng-eNB is connected to the 5GC through an NG interface. The 5GC may include an access and mobility management function (AMF) responsible for a control plane, such as UE access, mobility control function, etc., and a user plane function (UPF) responsible for a control function for user data. The NR supports both a frequency range of 6 GHz or lower (FR1, Frequency Range 1) and a frequency range of 6 GHz or higher (FR2, Frequency Range 2).

The gNB denotes a base station providing NR user plane and control plane protocol terminations toward a UE, and the ng-eNB denotes a base station providing E-UTRA user plane and control plane protocol terminations toward a UE. In the present disclosure, the base station should be understood as meaning including both the gNB and the ng-eNB and may be used as meaning of the gNB or the ng-eNB, if necessary.

<NR Waveform, Numerology and Frame Structure>

In the NR, a cyclic prefix (CP)-OFDM waveform using a cyclic prefix is used for downlink transmission, and a CP-OFDM or a Discrete Fourier Transform-spread (DFT-s)-OFDM is used for uplink transmission. The OFDM technique is considered more attractive technique in combining with multiple input multiple output (MIMO) and has the advantage capable of using a low complexity receiver with high frequency efficiency.

Meanwhile, in the NR, requirements for data rate, latency, coverage, etc. are different for each of the three scenarios described above. Therefore, it is necessary to efficiently satisfy the requirements for each scenario through frequency bands establishing an NR system. To do this, a technique has been proposed for efficiently multiplexing a plurality of numerology-based radio resources different from one another.

Specifically, NR transmission numerology is determined based on a subcarrier spacing and a cyclic prefix (CP), and the μ value has an exponential value of 2 based on 15 kHz and exponentially changed, as shown in Table 1 below.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
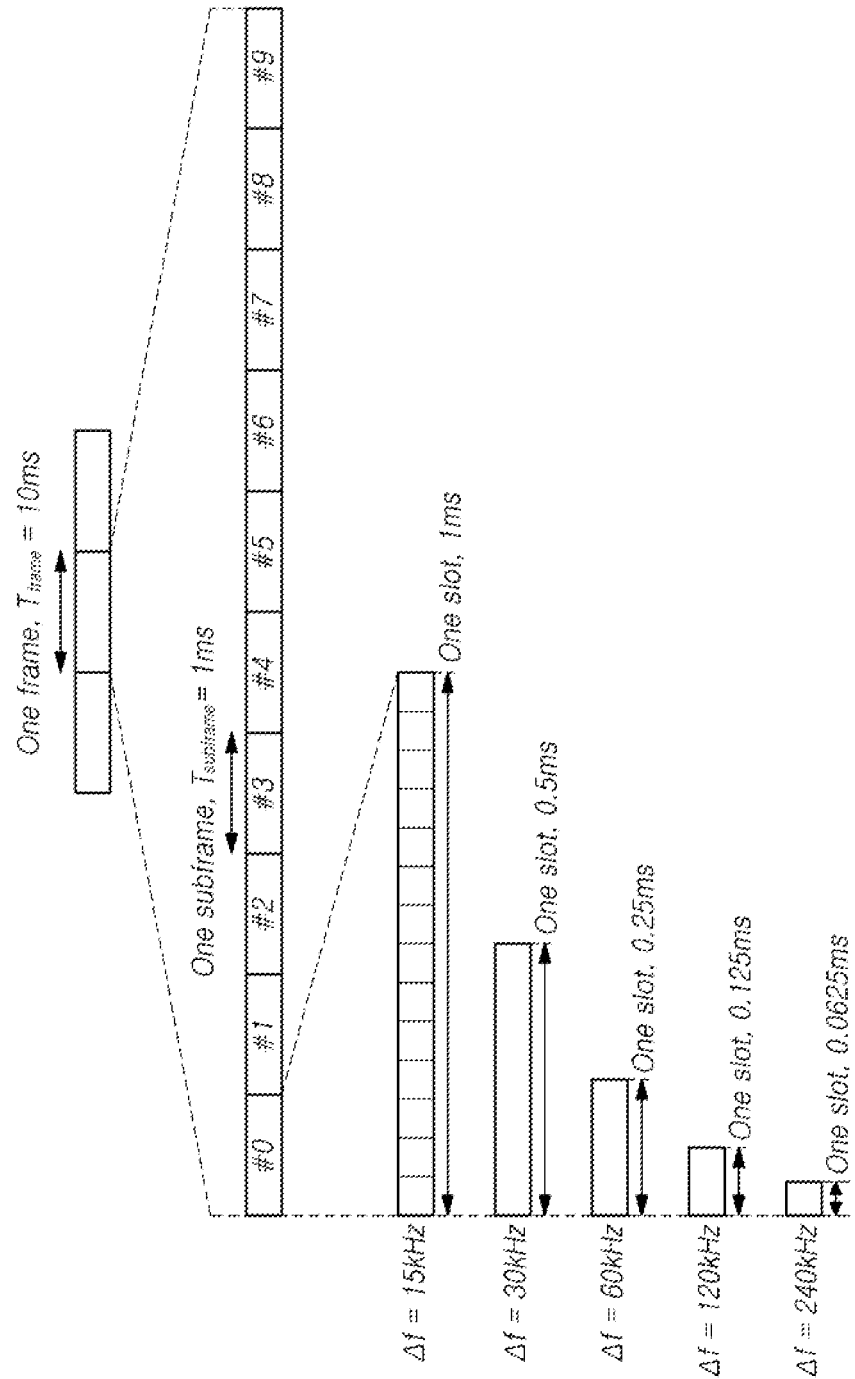
FIG. 2 is a diagram illustrating a frame structure of a NR system.

As shown in Table 1 above, the NR numerology may be classified into five types according to subcarrier spacings. Unlike the NR, in LTE that is one of 4G communication techniques, a subcarrier spacing is fixed with 15 kHz. Specifically, in the NR, subcarrier spacings used for data transmission are 15, 30, 60, and 120 kHz, and subcarrier spacings used for synchronous signal transmission are 15, 30, 12, and 240 kHz. Also, an extended CP is applied only to the 60 kHz subcarrier spacing. Meanwhile, as a frame structure of the NR, a frame is defined as a length of 10 ms composed of 10 subframes having the same length of 1 ms. One frame may be divided into 5 ms half frames, and each half frame includes 5 subframes. In the case of the 15 kHz subcarrier spacing, one subframe is composed of one slot and each slot is composed of 14 OFDM symbols. FIG. 2 is a diagram illustrating a frame structure of a NR system.

Referring to FIG. 2, the slot is fixedly made up of 14 OFDM symbols in the case of normal CP, but the length of the slot may vary according to subcarrier spacings. For example, in the case of a numerology with the 15 kHz subcarrier spacing, the slot has 1 ms length identical to the subframe. In the case of a numerology with the 30 kHz subcarrier spacing, the slot is composed of 14 OFDM symbols and has 0.5 ms length. Therefore, two slots may form one subframe. That is, the subframe and the frame are defined with a fixed time length, and the slot is defined by the number of symbols. Therefore, the time length may vary according to subcarrier spacings.

Meanwhile, NR defines a slot as a basic unit of scheduling and also introduces a minislot (or a subslot or a non-slot based schedule) to reduce transmission delay in the radio section. When a wide subcarrier spacing is used, the transmission delay in the radio section may be reduced because the length of one slot is shortened in inverse proportion. The minislot (or subslot) is for efficient support for URLLC scenarios and may be scheduled on the basis of 2, 4, or 7 symbols.

Also, unlike the LTE, the NR defines uplink and downlink resource allocations on a symbol basis within one slot. In order to reduce HARQ latency, a slot structure capable of directly transmitting HARQ ACK/NACK in a transmission slot is defined, and this slot structure is referred to as a self-contained structure for description.

The NR has been designed to support a total of 256 slot formats, of which 62 slot formats are used in Rel-15. In addition, a common frame structure including an FDD, or a TDD frame is supported through various slot combinations. For example, the NR supports i) a slot structure in which all symbols of a slot are configured in downlink, ii) a slot structure in which all symbols of a slot are configured in uplink, and iii) a slot structure in which downlink symbols and uplink symbols are combined. In addition, the NR supports that data transmission is scheduled with data distributed in one or more slots. Accordingly, a base station may inform a UE whether a corresponding slot is a downlink slot, an uplink slot, or a flexible slot, using a slot format indicator (SFI). The base station may indicate a slot format i) by indicating an index of a table configured through UE-specific RRC signaling, using the SFI, ii) dynamically through downlink control information (DCI), or iii) statically or quasi-statically through RRC.

<NR Physical Resources>

An antenna port, a resource grid, a resource element, a resource block, a bandwidth part, or the like is considered for a physical resource in the NR.

The antenna port is defined such that a channel for carrying a symbol on an antenna port may be inferred from a channel for carrying another symbol on the same antenna port. If a large-scale property of a channel carrying a symbol on one antenna port may be inferred from a channel carrying a symbol on another antenna port, the two antenna ports may be in a quasi co-located or quasi co-location (QC/QCL) relationship. Here, the large-scale property includes at least one of a delay spread, a Doppler spread, a frequency shift, an average received power, and a received timing.

Figure 3:
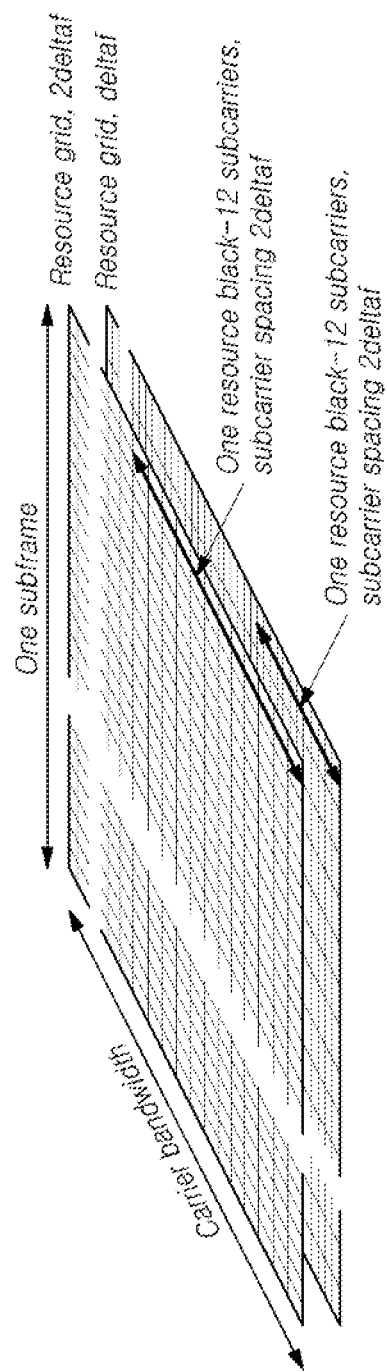
FIG. 3 is a diagram illustrating a resource grid supported by radio access technology.

FIG. 3 is a diagram illustrating a resource grid supported by radio access technology.

Referring to FIG. 3, since the NR supports a plurality of numerologies in the same carrier, a resource grid may be configured according to each numerology. In addition, the resource grid may be configured depending on an antenna port, a subcarrier spacing, and a transmission direction.

A resource block is composed of 12 subcarriers and is defined only in the frequency domain. In addition, a resource element is composed of one OFDM symbol and one subcarrier. Therefore, as shown in FIG. 3, the size of one resource block may vary according to the subcarrier spacings. In addition, the NR defines "Point A" that serves as a common reference point for resource block grids, a common resource block, and a virtual resource block.

Figure 4:
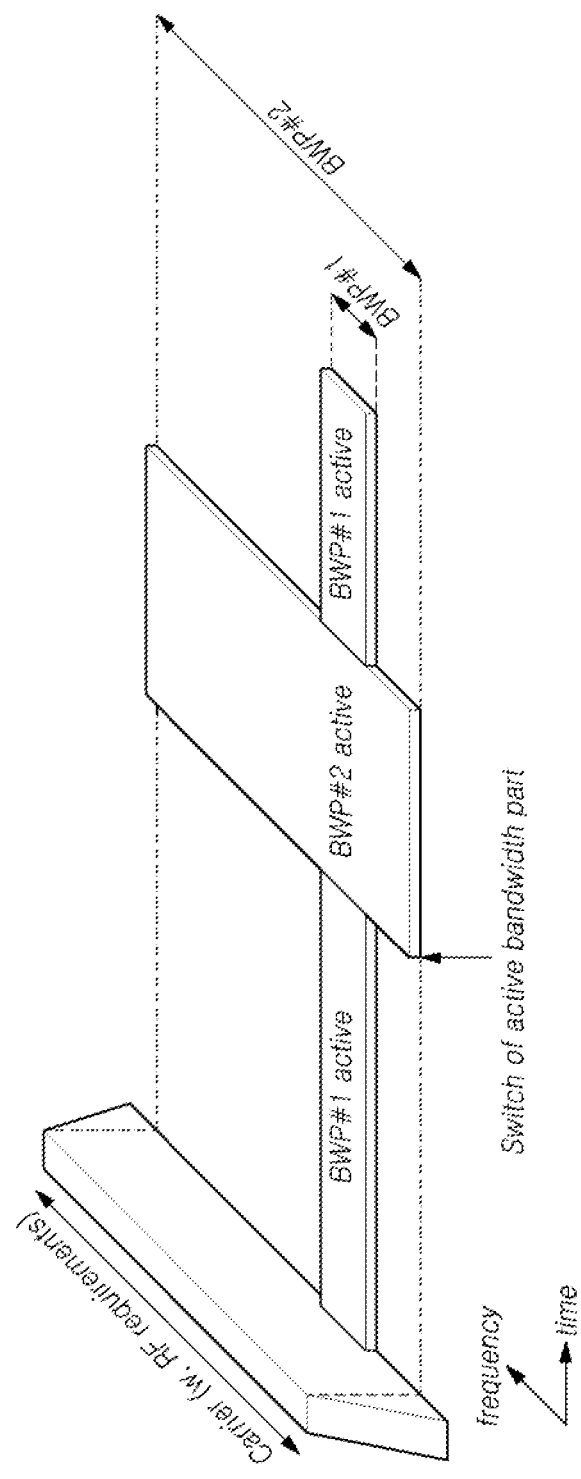
FIG. 4 is a diagram illustrating a bandwidth part supported by radio access technology.

FIG. 4 is a diagram illustrating a bandwidth part supported by radio access technology.

In the NR, the maximum carrier bandwidth is set from 50 MHz to 400 MHz according to subcarrier spacings, unlike the LTE in which carrier bandwidth is fixed at 20 MHz. Therefore, it is not assumed that all UEs use all of these carrier bandwidths. As a result, as shown in FIG. 4, in the NR, a bandwidth may be configured within a carrier bandwidth part in order for a UE to use. In addition, the bandwidth part i) is associated with one numerology, ii) is composed of a contiguous subset of the common resource blocks and iii) can be activated dynamically over time. In the UE, up to four bandwidth parts are configured in each of uplink and downlink, and data is transmitted/received using an activated bandwidth part at a given time.

In the case of a paired spectrum, the uplink and downlink bandwidth parts are configured independently. In the case of an unpaired spectrum, the downlink and uplink bandwidth parts are configured in pairs to enable a center frequency to be shared to prevent unnecessary frequency re-tuning between downlink and uplink operations.

<NR Initial Access>

In the NR, a UE performs cell search and random access procedures to access a base station and perform communication.

The cell search is a procedure of i) synchronizing a UE with a cell of a corresponding base station using a synchronization signal block (SSB) transmitted from the base station, ii) acquiring a physical layer cell ID, and iii) acquiring system information.

Figure 5:
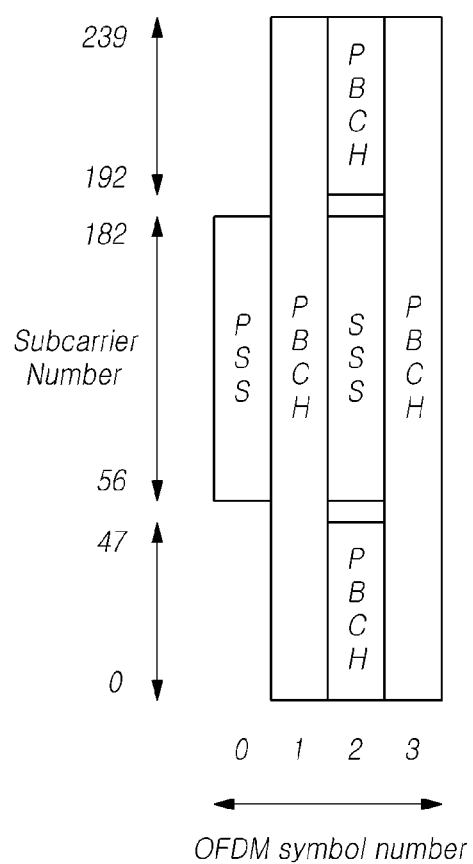
FIG. 5 is a diagram illustrating an exemplary synchronization signal block in radio access technology.

FIG. 5 is a diagram illustrating an exemplary synchronization signal block in radio access technology.

Referring to FIG. 5, the SSB includes i) a primary synchronization signal (PSS) and a secondary synchronization signal (SSS), each of which occupies one symbol and 127 subcarriers, and ii) a PBCH configured on three OFDM symbols and 240 subcarriers.

The UE monitors the SSB in the time and frequency domain and receives the SSB.

The SSB may be transmitted up to 64 times for 5 ms. A plurality of SSBs are transmitted in different transmission beams within 5 ms duration, and the UE detects the SSBs, assuming that the SSBs are transmitted every 20 ms period based on a specific one beam used for transmission. The higher the frequency band is, the greater the number of beams that may be used for SSB transmission within 5 ms duration can increase. For example, the SSBs may be transmitted using i) up to four different beams in a frequency band of 3 GHz or lower, ii) up to 8 different beams in a frequency band of 3 to 6 GHz, and iii) up to 64 different beams in a frequency band of 6 GHz or higher.

Two SSBs are included in one slot, and the start symbol and the number of repetitions in a slot are determined according to subcarrier spacings as described below.

Meanwhile, the SSB is not transmitted at a center frequency of a carrier bandwidth unlike the SS of the LTE. That is, the SSB may be transmitted on a frequency that is not the center of a system band, and a plurality of SSBs may be transmitted in the frequency domain in a case where wideband operation is supported. Thus, the UE monitors a SSB using a synchronization raster, which is a candidate frequency position for monitoring the SSB. A carrier raster and the synchronous raster, which are center frequency position information of a channel for initial access, are newly defined in the NR. The synchronous raster is configured with a wider frequency interval than the carrier raster, and thus, may support that a UE rapidly searches the SSB.

The UE may acquire a master information block (MIB) through the PBCH of the SSB. The MIB includes minimum information for receiving remaining minimum system information (RMSI) by the UE broadcast from the network. The PBCH may include information on the position of the first DM-RS symbol in the time domain, information for monitoring SIB1 by the UE (for example, SIB1 numerology information, SIB1 CORESET related information, search space information, PDCCH related parameter information, etc.), offset information between a common resource block and a SSB (the absolute position of the SSB in a carrier is transmitted via the SIB1), and the like. Here, the SIB1 numerology information is equally applied to messages 2 and 4 of a random access procedure for accessing a base station after the UE has completed the cell search procedure.

The RMSI means the system information block 1 (SIB1), and the SIB1 is broadcast periodically (ex, 160 ms) in a corresponding cell. The SIB1 includes information necessary for the UE to perform an initial random access procedure, and the SIB1 is periodically transmitted through the PDSCH. In order for the UE to receive the SIB1, the UE is required to receive numerology information used for SIB1 transmission and control resource set (CORESET) information used for SIB1 scheduling, through the PBCH. The UE checks scheduling information for the SIB1 using a SI-RNTI in the CORESET, and acquires the SIB1 on the PDSCH according to the scheduling information. Remaining SIBs other than the SIB1 may be transmitted periodically or may be transmitted according to the request of a UE.

Figure 6:
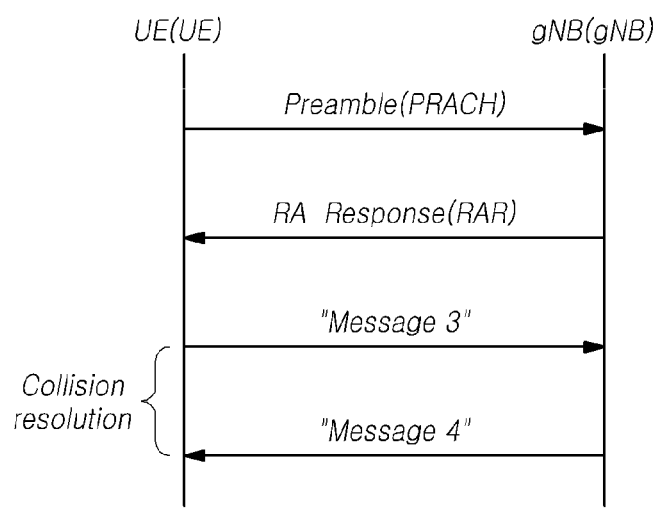
FIG. 6 is a diagram illustrating a random access procedure in radio access technology.

FIG. 6 is a diagram illustrating a random access procedure in radio access technology.

Referring to FIG. 6, when cell search is completed, a UE transmits a random access preamble for random access to a base station. The random access preamble is transmitted through PRACH. Specifically, the random access preamble is transmitted to the base station through PRACH, which is made up of consecutive radio resources in a specific slot repeated periodically. Generally, a contention-based random access procedure is performed when a UE initially accesses a cell, and a non-contention based random access procedure is performed when random access is performed for beam failure recovery (BFR).

The UE receives a random access response to the transmitted random access preamble. The random access response may include a random access preamble identifier (ID), an UL grant (uplink radio resource), a temporary cell-radio network temporary identifier (temporary C-RNTI), and a time alignment command (TAC). Since one random access response may include random access response information for one or more UEs, the random access preamble identifier may be included to inform which UE the included UL grant, temporary C-RNTI and TAC are valid to. The random access preamble identifier may be an identifier of a random access preamble received by the base station. The TAC may be included as information for adjusting uplink synchronization by a UE. The random access response may be indicated by a random access identifier on the PDCCH, i.e., a random access-radio network temporary identifier (RA-RNTI).

When receiving the valid random access response, the UE processes information included in the random access response and performs scheduled transmission to the base station. For example, the UE applies the TAC and stores the temporary C-RNTI. In addition, using the UL grant, the UE transmits data stored in a buffer or newly generated data to the base station. In this case, information for identifying the UE should be included.

The UE receives a downlink message for contention resolution.

<NR CORESET>

A downlink control channel in the NR is transmitted on a control resource set (CORESET) having a length of 1 to 3 symbols and transmits up/down scheduling information, slot format index (SFI) information, transmit power control information, and the like.

Thus, in the NR, in order to secure the flexibility of the system, the CORESET is introduced. The control resource set (CORESET) refers to a time-frequency resource for a downlink control signal. The UE may decode a control channel candidate using one or more search spaces in a CORESET time-frequency resource. Quasi CoLocation (QCL) assumption is established for each CORESET, which is used for the purpose of informing characteristics for analogue beam directions besides characteristics assumed by typical QCL, such as delayed spread, Doppler spread, Doppler shift, or average delay.

Figure 7:
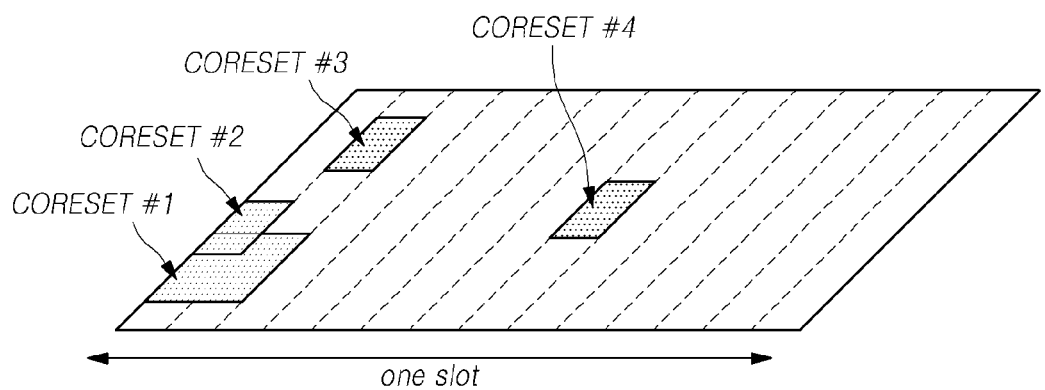
FIG. 7 is a diagram illustrating control resource sets (CORESETs).

FIG. 7 is a diagram illustrating CORESETs.

Referring to FIG. 7, a CORESET may be configured in various forms within a carrier bandwidth in one slot. The CORESET may include a maximum of 3 OFDM symbols in the time domain. In addition, the CORESET is defined as a multiple of six resource blocks up to the carrier bandwidth in the frequency domain.

The first CORESET is indicated through the MIB as a part of an initial bandwidth part configuration to enable additional configuration information and system information to be received from the network. After establishing a connection with a base station, a UE may receive and configure one or more pieces of CORESET information through RRC signaling.

Hereinafter, the URLLC will be described.

Hereinafter, the URLLC service will be described in detail.

The URLLC service is devised to meet requirements of the UE for scenarios in which reliability of data transmission and latency minimization are more important than data transmission rate, and both LTE system and the NR will support the URLLC.

Examples of the scenarios in which the reliability of data transmission and the latency minimization are important include a scenario for an autonomous vehicle required to recognize changes rapidly in an external situation such as an accident, a scenario for warning the detection of dangerous material leakage within a limited time, or the like.

As an example of the requirements related to the latency of the URLLC service, end-to-end (E2E) latency is required to be within 5 ms, and the latency of the user plane is required to be within 0.5 ms. As an example of the requirements related to the transmission reliability of the URLLC service, a block error rate (BLER) is required to be 10-5 or less, and it is required to support mobility for a UE moving at a high speed up to 500 km.

In order to satisfy the requirements for the URLLC service in the next generation mobile communication system, it is necessary for a resource used for data transmission/reception to be allocated rapidly to a UE using the URLLC service. In addition, it is necessary for a resource to be allocated to a UE using the URLLC service with a higher priority than a UE using an eMBB service or an mMTC service.

<NR Mini-Slot>

As described above, in the NR, one subframe is determined to be 1 ms regardless of the subcarrier spacing (SCS). One slot is composed of 14 OFDM symbols, and the number of slots forming one subframe may be different according to subcarrier spacings.

Thus, considering that it varies depending on the subcarrier spacings, in the NR, resources for data transmission/reception may be normally scheduled on a per-slot basis. This scheduling scheme is referred to as slot-based scheduling.

However, it is necessary for a UE using the URLLC service to be allocated resources for data transmission/reception in a unit smaller than the slot in order to satisfy a corresponding low latency requirement. Thus, with a subslot smaller than the slot defined, a technique for scheduling resources on a per-subslot basis is introduced into the NR, and this scheduling scheme is referred to as non-slot based scheduling.

The subslot may also be referred to as a mini-slot and may composed of 2, 4, or 7 OFDM symbols, unlike the slot composed of 14 OFDM symbols. Accordingly, when resources are scheduled on a per-subslot basis, a UE using the URLLC service may be allocated resources for data transmission/reception more rapidly.

Figure 8:
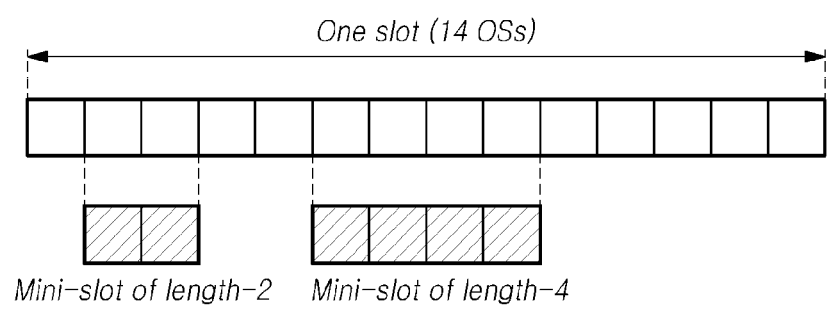
FIG. 8 is a diagram illustrating a comparison between a subslot and a slot.

FIG. 8 is a diagram illustrating a comparison between a subslot and a slot.

Referring to FIG. 8, one slot is composed of 14 OFDM symbols, whereas a subslot (mini-slot) is composed of 2 or 4 OFDM symbols. That is, when resources are scheduled on a per-subslot basis, a plurality of UEs may be allocated resources within one slot and then use them for data transmission/reception.

<Preemption>

Meanwhile, in order for a UE using the URLLC service to be allocated a resource with a high priority, the next generation mobile communication system provides a preemption technique that allows the UE to use a resource already allocated to another UE using the eMBB service or the mMTC service.

As described above, in order to support the URLLC service, it is necessary to subdivide a unit for performing resource scheduling in the time domain. As a result, a resource may be allocated to a UE using the URLLC service on the basis of a subslot, which is a time unit smaller than a slot.

On the contrary, it is preferable to define a unit for performing resource scheduling for a UE using the eMBB service or the mMTC service on the basis of a longer time compared with a UE using the URLLC service. The longer scheduling time unit, the less overhead that occurs in the process of controlling scheduling.

However, in the case of scheduling on the basis of such a long time, it is necessary to consider a case where a UE using the URLLC service is urgently required to be allocated a resource for data transmission while a UE using the MMTC service or the eMBB service allocated a resource on the basis of a long time is using the resource. For example, URLLC traffic may occur during eMBB transmission.

In this case, if a UE using the URLLC service is allocated a resource after UEs using the eMBB service or the mMTC service have used all allocated resources, there is a possibility of not satisfying the latency requirement required by the URLLC service.

As one way to solve this problem, it is possible to consider a method of configuring scheduling in the time domain on a short time basis for the e-MBB service and the mMTC service as well as the URLLC service. However, configuring scheduling in the time domain on a short time basis for all services for URLLC service traffic that is intermittently occurring results in increasing scheduling overhead as described above.

Therefore, in a case where a UE using the URLLC service required to satisfy latency requirements is urgently required to be allocated a resource, instead of being allocated a resource with scheduling on the basis of time units different from one another in the time domain for each service, it is possible for the UE using the URLLC service to preempt and use a part of a resource(s) allocated to a UE using the eMBB service or the mMTC service.

In a case where the UE using the URLLC service has preempted the resource, when a UE that has been originally allocated the resource receives information indicating that the preemption has occurred, the UE is required not to use the resource any longer or discard data transmitted through the resource.

That is, when a UE using the eMBB service or the mMTC service is instructed that an allocated resource is preempted by another UE using the URLLC service, the UE using the eMBB service or the mMTC service is required to flush data for the corresponding preempted resource area from the soft buffer.

Figure 9:
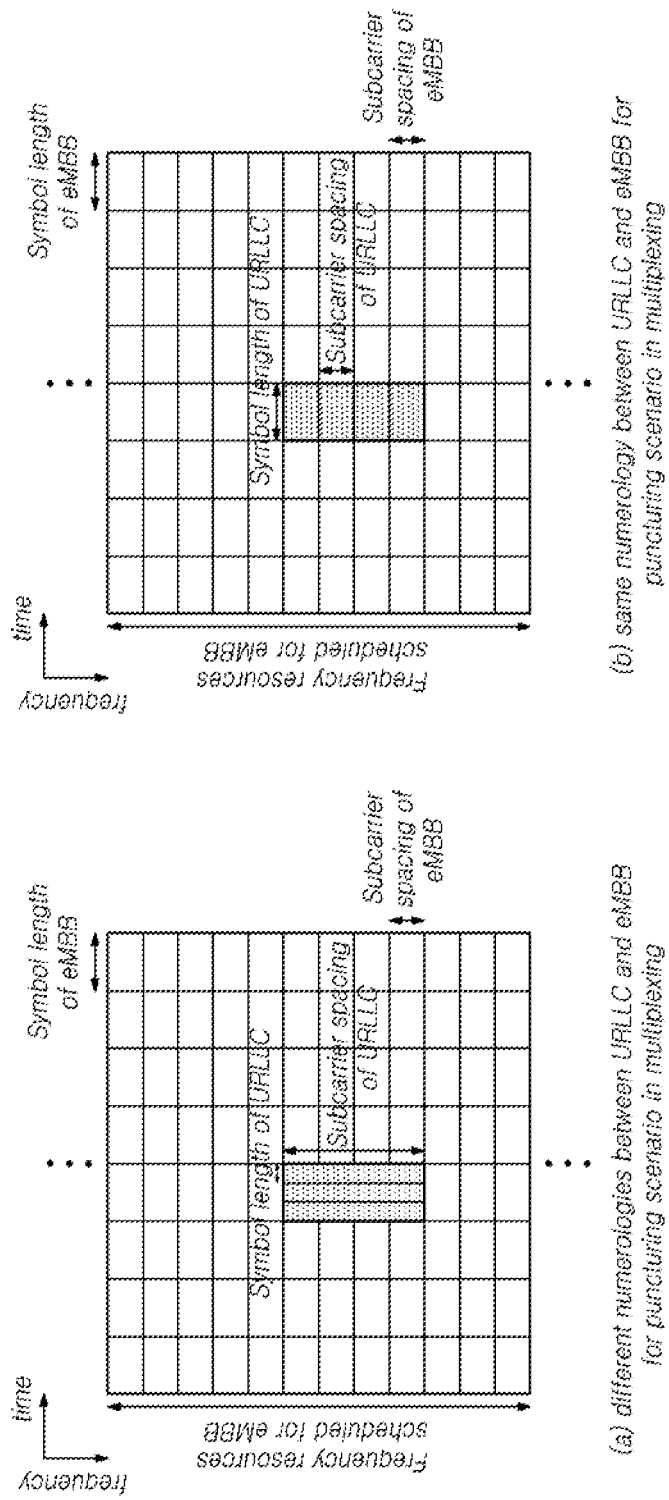
FIG. 9 is a diagram illustrating that a user equipment using a RLLC service preempts a resource allocated to a user equipment using an eMBB service.

FIG. 9 is a diagram illustrating that a UE using a RLLC service preempts a resource allocated to a UE using an eMBB service.

Referring to FIG. 9, a diagram (a) illustrates a case where a preemption occurs when a numerology applied to the URLLC service and a numerology applied to the eMBB service are different from each other.

In the diagram (a) of FIG. 9, a UE using the URLLC service selects and uses a 4th OFDM symbol from the left in the time domain among resources allocated to a UE using the eMBB service, a 4th to 7th subcarrier resources from the bottom in the frequency domain.

In this case, since the numerology for the URLLC service is applied to resources preempted by the UE using the URLLC service, an OFDM symbol length and a subcarrier spacing of the preempted resources are different from a symbol length and a subcarrier spacing of resources allocated to the UE using the eMBB service.

A diagram (b) of FIG. 9 illustrates a case where preemption occurs when a numerology applied to the URLLC service and a numerology applied to the eMBB service are the same.

Similar to the diagram (a) of FIG. 9, in the diagram (b) of FIG. 9, a UE using the URLLC service preempts and uses a 4th OFDM symbol from the left in the time domain among resources allocated to a UE using the eMBB service, a 4th to 7th subcarrier resources from the bottom in the frequency domain.

In this case, since the same numerology is applied to the resources preempted by the UE using the URLLC service, an OFDM symbol length and a subcarrier spacing of the preempted resources are identical to a symbol length and a subcarrier spacing of resources allocated to the UE using the eMBB service.

<URLLC HARQ>

The NR supports flexible HARQ timing based on dynamic downlink control information considering dynamic TDD operation. For example, in a state where a plurality of PDCCH-to-PDSCH and PDSCH-to-PUCCH time delay values are set for each UE through RRC signaling, a specific delay value is indicated using downlink or uplink scheduling information.

Meanwhile, in order to reduce latency in the URLLC service, it is necessary to configure a retransmission unit smaller than the LTE.

In the case of the LTE, when transmitting data, it is determined whether data retransmission is performed on a transmission block (or a transport block) (TB) basis.

Specifically, when a transmitting end transmits a transmission block, a 24-bit CRC (Cyclic Redundancy Check) is additionally inserted into the entire transmission block, and the CRC is additionally inserted into each code block (CB) composing the transmission block.

A receiving end that receives the transmission block transmitted from the transmitting end performs a CRC check on the CRC for the entire transmission block and the CRC for each code block.

At this time, if the CRC check is successful for both the CRC for the entire transmission block and the CRC for each code block, the receiving end determines that there is no error in the corresponding transmission block. On the other hand, if the CRC check fails for either the CRC for the entire transmission block or the CRC for each code block, the receiving end determines that there is an error in the corresponding transmission block and requests retransmission for the entire transmission block.

However, if it is requested to retransmit the entire transmission block even though an error has occurred in only a part of a transmission block, there occurs a problem that a resource used for retransmitting the transmission block increases.

Therefore, in the NR, when there is an error in a part of a transmission block, it is defined to perform retransmission only for the part in which the error has occurred, and thereby to provide a function for reducing resources required for the retransmission of the transmission block. In this case, the retransmission is performed on the basis of not a transmission block but a code block group (CBG) smaller than the transmission block. Therefore, such a retransmission method is referred to as CBG based retransmission.

In the CBG based retransmission, one or more code blocks may be grouped into one code block group. Thus, a transmission block may be composed of one or more code block groups.

When determining whether retransmission is required for a transmission block, a receiving end checks a CRC of each code block composing the code block group to inspect whether an error has occurred. If an error occurs in any of code blocks composing the code block group, the receiving end requests retransmission of the code block group.

If one transmission block is composed of N code block groups, the receiving end records information indicating which code block group should be retransmitted among the N code block groups, in HARQ ACK/NACK for the corresponding transmission block. The transmitting end may retransmit only the corresponding code block group indicated for retransmission by receiving the corresponding HARQ ACK/NACK.

Figure 10:
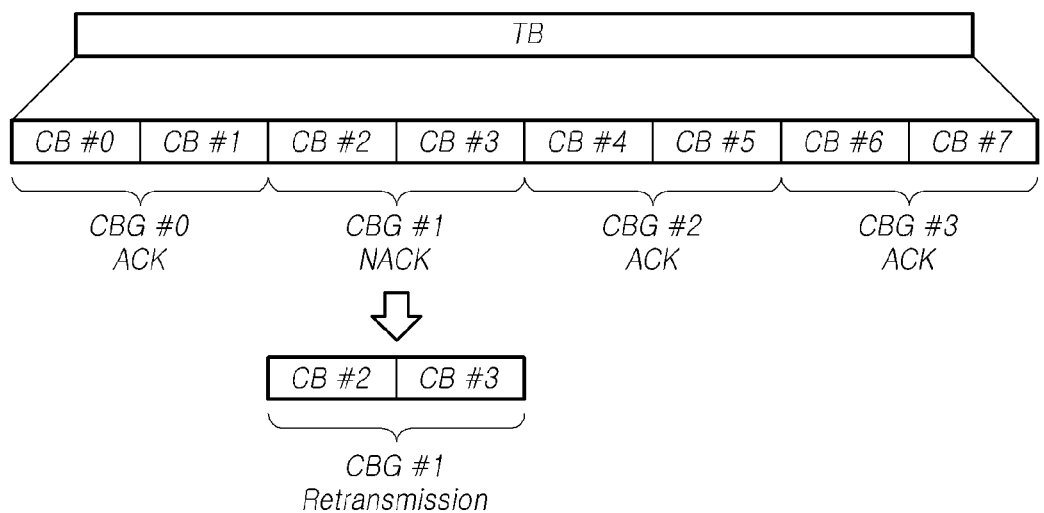
FIG. 10 is a diagram illustrating a transmission block configuration for supporting code block group based retransmission.

FIG. 10 is a diagram illustrating a transmission block configuration for supporting code block group based retransmission.

Referring to FIG. 10, the entire transmission block is composed of a total of 8 code blocks from CB #0 to CB #7. In this case, i) code blocks CB #0 and CB #1 form a code block group CBG #0, ii) code blocks CB #2 and CB #3 form a code block group CBG #1, iii) code blocks CB #4 and CB #5 form a code block group CBG #2, and □) code blocks CB #6 and CB #7 form code block group CBG #3.

If a CRC error occurs in the code block CB #2 or the code block CB #3 in a transmission block received by a receiving end, when transmitting HARQ ACK/NACK information to a transmitting end, the receiving end configures i) ACK for the code block group CBG #0, ii) NACK for the code block group CBG #1, iii) ACK for the code block group CBG #2, and □) ACK for the code block group CBG #3, and transmits the configured information.

When receiving the HARQ ACK/NACK information and identifying that NACK is set to only the code block group CBG #1, the transmitting end may perform retransmission only for the corresponding code block group CBG #1 to the receiving end.

Information on which code block group is retransmitted among code block groups forming a transmission block is indicated through downlink control information (DCI). It is indicated whether or not a specific code block group is retransmitted through a code block group transmission indicator (CBGTI, CBG Transmit Indicator) of the downlink control information. It is also indicated whether or not soft combining is to be performed for a retransmitted code block group through a code block group flush indicator (CBGTI, CBG Flush Indicator) of the downlink control information.

A frequency, a frame, a subframe, a resource, a resource block (RB), a region, a band, a sub-band, a control channel, a data channel, a synchronization signal, various reference signals, various signals, and various messages associated with NR of the present disclosure may be interpreted as being used in the past or present or as various meanings to be used in the future.

Summary of NR (New Radio)

Recently, the 3rd generation partnership project (3GPP) has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for the new radio (NR).

The NR is required to be designed not only to provide an improved data transmission rate as compared with the long term evolution (LTE)/LTE-Advanced, but also to meet various requirements of each detailed and specific usage scenario. In particular, an enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design frame structures to be flexible, compared with the LTE/LTE-Advanced.

Specifically, the eMBB, mMTC, URLLC are considered as representative usage scenarios of the NR having been discussed in the 3GPP. Since each usage scenario imposes a different requirement of data rate, latency, coverage, etc., discussions on necessity for techniques of efficiently multiplexing radio resource units based on different types of numerology (e.g., a subcarrier spacing (SCS), a subframe, a transmission time interval (TTI), etc.) are in progress as methods for efficiently satisfying requirements of each usage scenario through a frequency band configuring an NR system.

To this end, there have been discussions on i) methods of multiplexing numerologies having subcarrier spacing (SCS) values different from one another based on TDM, FDM or TDM/FDM through one NR carrier, and ii) methods of supporting one or more time units in configuring a scheduling unit in the time domain.

In this regard, the NR has defined i) a subframe as one type of a time domain structure, and as a reference numerology to define a corresponding subframe duration, ii) a single subframe duration composed of 14 OFDM symbols of normal CP overhead based on a subcarrier spacing (SCS) of 15 kHz, which is the same as the LTE. Therefore, the subframe in the NR has the time duration of 1 ms. Unlike the LTE, since the subframe in the NR is an absolute reference time duration, a slot and a minislot may be defined as a time unit for actual UL/DL data scheduling. In this case, the number of OFDM symbols included in the slot, a y value, has been determined to be equals to 14 regardless of numerologies, but not limited thereto.

Therefore, a slot may be composed of 14 symbols. In accordance with a transmission direction for a corresponding slot, all symbols may be used for DL transmission or UL transmission, or the symbols may be used in the configuration of a DL portion+a gap+a UL portion.

Further, a minislot composed of fewer symbols than the slot has been defined in a numerology (or SCS), and as a result, a short time domain scheduling interval may be configured for UL/DL data transmission or reception based on the minislot. Also, a long time domain scheduling interval may be configured for the UL/DL data transmission or reception by slot aggregation.

In particular, in the case of transmission/reception of latency-critical data, such as the URLLC, it may be difficult to meet latency requirements when scheduling is performed on the basis of a slot having 0.5 ms (7 symbols) or 1 ms (14 symbols) defined in a frame structure based on a numerology having a small SCS value such as 15 kHz. To solve this problem, by defining a minislot composed of fewer OFDM symbols than the slot, it is possible to enable scheduling for latency-critical data, such as the URLLC, to be performed based on the minislot.

Further, methods have been discussed for scheduling data according to latency requirements based on a slot (or a minislot) length defined for each numerology, by multiplexing numerologies having different SCS values from one another in one NR carrier, using the TDM or FDM technique, as described above. For example, as shown in FIG. 2, since a symbol length for the SCS of 60 kHz is reduced by about a fourth of that for the SCS of 15 kHz, when one slot is composed of seven OFDM symbols in both the cases, a slot length based on the SCS of 15 kHz is 0.5 ms, whereas a slot length based on the SCS of 60 kHz reduces to about 0.125 ms.

As described above, discussion on methods of satisfying each requirement of URLLC and eMBB is in progress by defining different SCSs or different TTI lengths in the NR.

NR PDCCH

Physical layer control information, such as DL allocation downlink control information (DCI) and UL grant DCI is transmitted and received through the PDCCH, in the NR and LTE/LTE-A systems. A control channel element (CCE) is defined as a resource unit for transmission of the PDCCH. In the NR, a CORESET (Control Resource Set), which is a frequency/time resource for PDCCH transmission, may be configured for each UE, with reference to FIG. 7, as described above. In addition, each CORESET may be composed of one or more search spaces configured by one or more PDCCH candidates for monitoring the PDCCH by a UE.

Wider Bandwidth Operations

A typical LTE system supports scalable bandwidth operations for an LTE component carrier (CC). An LTE service provider may organize a bandwidth of at least 1.4 MHz up to 20 MHz according to a frequency deployment scenario when configuring one LTE CC. Accordingly, any normal LTE UE supports transmission/reception capabilities of the bandwidth of 20 MHz for one LTE CC.

However, the NR is designed for enabling UEs having transmission/reception bandwidth capabilities different from one another to be supported in one broadband NR component carrier. Accordingly, as illustrated in FIG. 4, it is required to i) configure one or more bandwidth parts (BWPs) composed of subdivided bandwidths for an NR component carrier (CC), and ii) support flexible wider bandwidth operations by configuring and activating BWPs different from one another for each UE.

Specifically, in the NR, one or more BWPs may be configured through one serving cell configured from a UE perspective. The corresponding UE may transmit/receive UP/DL data by activating one DL BWP and one UP BWP in the serving cell. In addition, in a case where a plurality of serving cells are established on a UE, that is, carrier aggregation (CA) is applied to the UE, it is possible to activate one DL bandwidth part and/or one UL BWP for each serving cell, and then transmit and/or receive UP/DL data using a radio resource of each serving cell.

Specifically, an initial bandwidth part may be defined for an initial access procedure in a serving cell, and one or more UE-specific BWPs may be configured through RRC signaling dedicated for each UE, and a default bandwidth part may be defined for a fallback operation for each UE.

In this case, it may be defined to activate and use a plurality of downlink and/or uplink BWPs simultaneously according to the configurations of BWPs and capabilities of a UE in any serving cell. In this regard, NR rel-15 defines to activate and use only one DL BWP and one UL BWP in any UE at any time.

NR MCS & TBS Determination

In the typical LTE system, a base station transmits modulation and coding scheme (MCS) indication information for PDSCH or PUSCH transmission/reception to a UE through downlink control information (DCI). Also, based on an MCS table or a TBS table, a modulation order and a transport block size (TBS) index are mapped according to the MCS indication information, i.e., MCS index information, indicated through the DCI, and a TBS is mapped based on the TBS index and the number of allocated TBSs. Details of methods of configuring an MCS and a relevant TBS can be found in the documents of 3GPP TS 36.213 and TS 38.214.

Also, methods of determining the MCS and the TBS of the LTE may be applied equally in the NR.

In the present disclosure, a method and apparatus are proposed for configuring the MCS and the TBS to support data transmission with different target BLERs in NR or LTE/LTE-A systems.

As a usage scenario provided by the NR and the LTE/LTE-A systems, there is increasing importance of methods for effectively supporting, as well as data related to the eMBB service to maximize data transmission rate, data related to the URLLC service to maximize reliability.

In particular, since the URLLC requires an improved target BLER (Block Error Rate) compared with a target BLER for typical eMBB data, therefore, it is required to design a new MCS table or TBS table is required for this purpose.

In this present disclosure, a method and apparatus are proposed for efficiently operating a MCS table or a TBS table based on different target BLERs if the MCS table or the TBS table is defined as described above.

As described above, there occurs a difference between reliability requirements required for data transmission according to usage scenarios, and accordingly, target BLERs for data transmission, i.e. PDSCH transmission or PUSCH transmission, may be different. To satisfy such separate target BLERs, it is required to define i) a separate CQI table for CQI reporting of a UE for each target BLER, and ii) a separate MCS table for each target BLER.

For example, in the case of an MCS table optimized for maximizing the transmission rate, such as in the eMBB, it is possible to configure an MCS table based on higher order modulation. For example, in the case of an MCS table for reliability-critical data, such as in the URLLC, it is possible to configure an MCS table based on lower order modulation. That is, according to the target BLER values, as the target BLER is higher, it is possible to configure an MCS table having an MCS index based on a higher order modulation scheme such as 64QAM, 256QAM, or 1024QAM. As the target BLER is lower, it is possible to configure another MCS table having an MCS index based on a lower order modulation scheme such as QPSK or 16 QAM may be constructed.

Accordingly, in the NR or the LTE/LTE-A systems, a separate CQI table for CQI or CSI reporting of a UE may be defined for each target BLER. That is, it is possible to define a plurality of CQI tables. Accordingly, i) a base station or a network may configure configuration information on a CQI table to be applied for CQI reporting in a UE based on a target BLER required for each UE through higher layer signaling, and ii) MCS table configuration may be performed according to the configured CQI table information.

That is, a plurality of different CQI tables may be defined according to target BLERs for data transmission/reception. CQI table configuration information to be applied for CQI reporting for each UE may be configured by the base station and transmitted to each UE through higher layer signaling. For example, CQI table A, CQI table B, CQI table C, . . . etc. may be defined for each target BLER, and a CQI table to be applied to each UE may be configured. Further, it is possible to define a plurality of different MCS tables or TBS tables for data transmission/reception through the PDSCH/PUSCH for each target BLER or for each relevant CQI table.

That is, MCS table A, MCS table B, MCS table C, . . . , etc. may be defined for each target BLER or for each relevant CQI table. An MCS table to be applied for data channel transmission/reception for each UE may be defined to be determined according to CQI table configuration information. As another example, MCS table A, MCS table B, MCS table C, . . . , etc. may be defined for each target BLER or for each relevant CQI table. A TBS table to be applied for data channel transmission/reception for each UE may be defined to be determined according to the CQI table configuration information.

As another method of configuring the CQI table and the relevant MCS table or TBS table, a method may be defined for selecting a dynamic MCS table or TBS table. For example, it is possible to configure simultaneously both a session (i.e., an eMBB-based service) that requires a high data transmission rate and a session (i.e., a URLLC service) that requires high reliability, for any one UE. Accordingly, it may be necessary for one UE to simultaneously support data transmission based on different target BLERs.

In this case, as described above, it is required to configure a dynamic MCS table or TBS table for each PDSCH or PUSCH transmission other than a method of configuring a semi-static MCS table or TBS table through higher layer signaling.

In this case, a plurality of CQI reporting or CSI reporting processes may be established in a base station or a network for any one UE. A separate CQI table to be applied for CQI reporting is configured for each CQI reporting or CSI reporting process, and then information on the configured separate CQI table may be transmitted to a corresponding UE through higher layer signaling.

In addition, when the eMBB-based service and the URLLC-based service are simultaneously supported for any one UE, target BLERs may be different for each PDSCH or PUSCH transmission for the corresponding UE, as described above. Accordingly, it is necessary to define a method of dynamically configuring an MCS table to be applied for each PDSCH or PUSCH transmission.

As a method for this, a base station may be defined to dynamically configure information for selecting an MCS table to be applied through scheduling DCI on the PDSCH or PUSCH and then signals to a corresponding UE. That is, in configuring a DL allocation DCI format or a UL grant DCI format for a UE, it may be defined to include an information area or an information field for selecting the MCS table.

As another method for selecting the MCS table through scheduling DCI on the PDSCH or the PUSCH, corresponding information may be implicitly signaled through the scheduling DCI.

For example, the MCS table selection information may be implicitly determined by a RNTI for PDCCH decoding of a UE. That is, when such a new MCS table for the URLLC is configured for a UE, the base station may allocate a new RNTI for the new MCS table through higher layer signaling. For example, an MCS-C-RNTI may be allocated for applying the new MCS table for the URLLC. The UE may derive corresponding MCS table selection information based on the MCS-C-RNTI, which is the new RNTI. The MCS-C-RNTI is scrambled by a CRC of the PDCCH.

Specifically, in addition to scheduling control information based on a MCS table defined for providing the typical eMBB service, i.e., the C-RNTI or the CS-RNTI allocated for UE-specific DL allocation DCI or UL grant DCI transmission/reception, it is possible to define i) separately scheduling control information based on an MCS table newly defined for the URLLC, i.e., the MCS-C-RNTI or the MCS-CS-RNTI for UE-specific DL allocation DCI or UL grant transmission/reception, and ii) an MCS table to be selected based on this.

The new MCS-C-RNTI or MCS-CS-RNTI for the URLLC is either explicitly allocated by the base station through higher layer signaling or defined as a function of the typical C-RNTI or CS-RNTI allocated for the UE. For example, a value obtained by adding a specific value to the allocated C-RNTI or CS-RNTI may be defined as an MCS-C-RNTI or MCS-CS-RNTI value for DCI transmission/reception based on the MCS table defined for the URLLC.

Whether an information area for selecting an MCS table is included in the DL allocation DCI format or the UL grant DCI format configured for monitoring by a UE may be i) configured through higher layer signaling for each UE, or ii) implicitly determined depending on whether a plurality of CQI reports or CSI reports based on different CQI tables for each target BLER is configured.

That is, when a plurality of CQI reports or CSI reports based on CQI tables different from one another are configured, the DL allocation DCI format or the UL grant DCI format for a corresponding UE may be defined to include an information area for selecting an MCS table. Otherwise, the DL allocation DCI format or the UL grant DCI format for the corresponding UE may be defined not to include the information area for selecting an MCS table.

In addition, the size of the information area for selecting an MCS table is determined i) by the maximum number of MCS tables, an N vale (eg, log 2N bits), for each target BLER defined in the NR system or the LTE/LTE-A system, or ii) by the number of the CQI tables, a M value (Eg, log 2M bits), applied by CQI or CSI reporting processes established for a corresponding UE, and the M value.

As another method for configuring the MCS table, it may be defined to configure an MCS table to be applied for each CORESET or search space configured for a UE. For example, when a CORESET is configured for a UE, it is possible to define that a base station i) configures MCS information included in the PDCCH transmitted through the CORESET, more specifically DL allocation DCI or UL grant DCI, ii) configures an MCS table for interpreting the MCS information, and iii) transmits it to the corresponding UE through higher layer signaling.

For example, when CORESET A, CORESET B, and CORESET C are configured for a UE, and support for MCS table A and MCS table B according to target BLER A and target BLER B for data transmission required by the UE is required, it is possible to define that the base station configures MCS configuration information included in the DL allocation DCI or the UL grant DCI for each CORESET and transmits MCS table configuration information used for determining by the UE which one of the MCS table A and the MCS table B is applied through higher layer signaling.

That is, when configuration or reconfiguration information for each CORESET A, CORESET B, and CORESET C is transmitted, it is possible to define that the configuration or reconfiguration information includes MCS table configuration information to be applied to the DL allocation DCI or the UL grant DCI transmitted through a corresponding CORESET.

As another example, the MCS table to be applied may be configured for each search space configured in a CORESET or through a plurality of CORESETs. For example, a base station may configure the MCS table to be applied for each search space and transmit to a US through higher layer signaling.

As another example, the MCS table may be implicitly configured by each search space kind/type (e.g., CSS or UE-specific SS) or an aggregation level (AL) of PDCCH candidates composing each search space.

As another example, the search space may be defined as a set of CCEs composed of PDCCH candidates based on an aggregation level (AL). Accordingly, the MCS table is configured for each search space, which may be construed in the same meaning as the MCS table is configured for each set of PDCCH candidates composed for each aggregation level (AL).

As another method for configuring the MCS table, an MCS table may be defined to be implicitly applied is determined according to a transmission method of the PDCCH. For example, the MCS table to be applied may be determined according to i) whether interleaving is applied, or PDCCH is repeatedly transmitted, or ii) a bundle size.

As another method for configuring the MCS table to be applied, an MCS table to be applied may be configured for each DCI format configured to monitor by a UE. Specifically, a DL allocation DCI format or UL grant DCI format and an MCS table to be applied may be separately defined, for each target BLER.

For example, when data transmission/reception based on target BLER A and target BLER B is supported in an NR system or LTE/LTE-A system, it is possible to define an MCS table for the target BLER A, and one or more DL allocation or UL grant DCI formats based on this. In addition, an MCS table for the target BLER B and one or more DL allocation or UL Grant DCI formats may be defined separately from each other. Accordingly, the MCS table to be applied may be defined to be implicitly mapped according to the DCI format configured for monitoring by a UE through a CORESET or search space.

As another example, when a DCI format for monitoring by each UE is configured or a PDSCH/PUSCH transmission mode is set, it is possible to define that the MCS table configuration information to be applied, which is included in data or information to be transmitted by the configuration or the setting, is explicitly transmitted to the UE through higher layer signaling.

In this case, the higher layer signaling includes MAC CE signaling or RRC signaling and may be cell-specific or UE-specific higher layer signaling.

In the present disclosure, methods are proposed for configuring an MCS table for PDSCH/PUSCH transmission for a UE when different MCS tables are defined for each target BLER, and embodiments of the present disclosure may be applied regardless of a specific method for configuring an MCS table for each target BLER.

In configuring a plurality of MCS tables described above, when a plurality of TBS tables are defined for each target BLER, TBS table configuration and selection methods may be applied in the same manner as the MCS table configuration and selection methods.

In addition, in a case where a plurality of CQI or MCS tables are defined for each target BLER for data transmission in the NR or LTE/LTE-A systems, as described above, it is possible to define a default (or fallback) CQI table or MCS table for each UE. The default MCS table may be defined as an MCS table to be applied in fallback operation of a corresponding UE.

For example, in the case of a UE-specific DCI (e.g., DL allocation DCI or UL grant DCI) transmitted through a common search space (CSS) or a fallback DCI format, a base station may configure an MCS index based on a default MCS table defined for a corresponding UE, and then cause the UE to construe it, regardless of the MCS table configuration method and the resultant UE-specific MCS table configuration information. The default MCS table may be defined in such a manner that i) a specific MCS table for each system/network may be fixed as a default MCS table for all UEs based on the corresponding system/network, ii)

each separate MCS table according to capabilities of UEs, etc. may be defined as a default MCS table, or iii) a default MCS table may be configured by the corresponding network through cell-specific higher layer signaling or UE-specific higher layer signaling.

In addition, one or more cases/embodiments where a MCS table is selected from any or all combinations of the above-described methods may be included in the scope of the present disclosure.

As described above, in a case where an MCS table or a TBS table based on different target BLERs is defined, a method and apparatus have been described for efficiently operating the MCS table or the TBS table. Hereinafter, referring to FIGS. 10 to 13, methods and apparatuses will be described for transmitting/receiving control information for a physical data channel, such as a PDSCH or a PUSCH through a physical downlink control channel and transmitting/receiving a physical data channel. Although the methods and apparatuses will be described using some of the embodiments described above, they are equally applicable to other embodiments.

Figure 11:
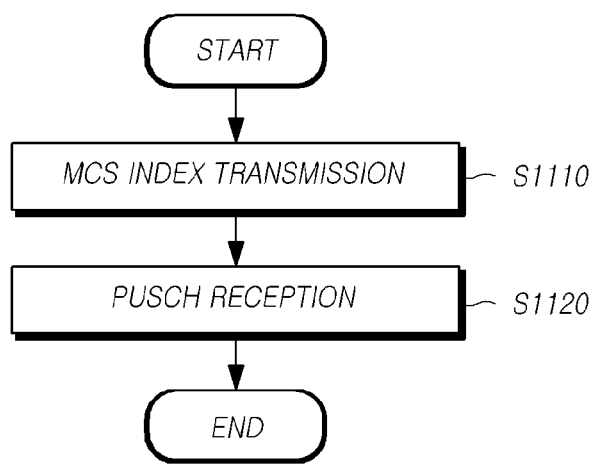
FIG. 11 is a flow chart illustrating a method of a base station for transmitting control information on a physical uplink shared channel according to an embodiment of the present disclosure.

FIG. 11 is a flow chart illustrating a method of a base station for transmitting control information on a physical uplink shared channel according to an embodiment of the present disclosure.

Referring to FIG. 11, a method of a base station is provided for transmitting control information on a physical uplink data channel (physical uplink shared channel). The method 1100 includes transmitting control information indicating a specific modulation and coding scheme (MCS) index corresponding to modulation and coding scheme (MCS) information to be applied to the physical uplink shared channel through a physical downlink control channel (S1110), and receiving the physical uplink shared channel modulated based on specific MCS information determined using the specific MCS index and one of two or more MCS tables containing modulation order information corresponding to the specific MCS index (S1120). These MCS tables may additionally include a target code rate corresponding to the specific MCS index, which is calculated by the target BLER described above and spectral efficiency.

In the transmitting S1110, a UL grant DCI format for a UE may include an information region or an information field indicating the specific modulation and coding scheme (MCS) index corresponding to the specific modulation and coding scheme (MCS) information. This information field may be an MCS index field.

At least one of the two or more MCS tables may be an MCS table based on a higher modulation order including 64QAM or 256QAM, and another of the MCS tables may be an MCS table based on a lower modulation order including QPSK or 16QAM.

For example, in the case of an MCS table optimized for maximizing the transmission rate, such as the eMBB, an MCS table may be configured based on higher order modulation. For example, in the case of an MCS table for reliability-critical data, such as in the URLLC, an MCS table may be configured based on lower order modulation. That is, according to the target BLER values, as a corresponding target BLER is higher, an MCS table having an MCS index may be configured based on a higher order modulation scheme such as 64QAM, 256QAM, or 1024QAM. As a target BLER is lower, another MCS table having an MCS index may be configured based on a lower order modulation scheme such as QPSK or 16 QAM.

The base station may implicitly signal information for selecting one of the two or more MCS tables through UL grant DCI for the PUSCH.

One of the two or more MCS tables may be determined by an RNTI value scrambled with a CRC of the physical downlink control channel (PDCCH). The RNTI may be a new MCS-C-RNTI or a new MCS-CS-RNTI that is additionally allocated for the URLLC other than a typical C-RNTI and a typical CS-RNTI.

For example, the information for selecting one of two or more MCS tables may be implicitly determined by a RNTI for PDCCH decoding of the UE. That is, when such a new MCS table for the URLLC is configured for any UE, a new RNTI for the new MCS table, i.e., an MCS-C-RNTI or an MCS-CS-RNTI may be allocated by the base station through higher layer signaling. The UE may derive information for selecting one of two or more MCS tables based on the new RNTI, i.e., the MCS-C-RNTI or the MCS-CS-RNTI.

Specifically, in addition to scheduling control information based on an MCS table defined for providing the typical eMBB service, i.e., the C-RNTI or the CS-RNTI allocated for UE-specific DL allocation DCI or UL grant DCI transmission/reception, i) scheduling control information may be separately defined based on an MCS table newly defined for the URLLC, i.e., the new RNTI (e.g., the MCS-C-RNTI or the MCS-CS-RNTI) for UE-specific DL allocation DCI or UL grant transmission/reception, and ii) one of two or more MCS tables may be selected based on this newly defined information.

As another method of selecting one of two or more MCS tables, an MCS table to be applied may be selected for each search space configured for any UE.

One of the two or more MCS tables may be determined by a type of search space through which physical downlink control channel (PDCCH) transmission is performed. The type of search space may be a UE-specific search space.

That is, the MCS table may be implicitly configured by each search space kind/type (e.g., CS or UE-specific SS) through which the physical downlink control channel (PDCCH) transmission is performed.

In the receiving S1120, the base station receives the physical uplink shard channel (PUSCH) modulated based on the specific MCS information determined using the specific MCS index and one of the two or more MCS tables.

That is, the UE determines the specific MCS information using the specific MCS index and one of two or more MCS tables. The UE encodes the physical uplink shard channel (PUSCH) based on the specific MCS information.

The UE transmits this physical uplink shared channel (PUSCH) to the base station. The base station receives this physical uplink shared channel (PUSCH) from the UE.

Figure 12:
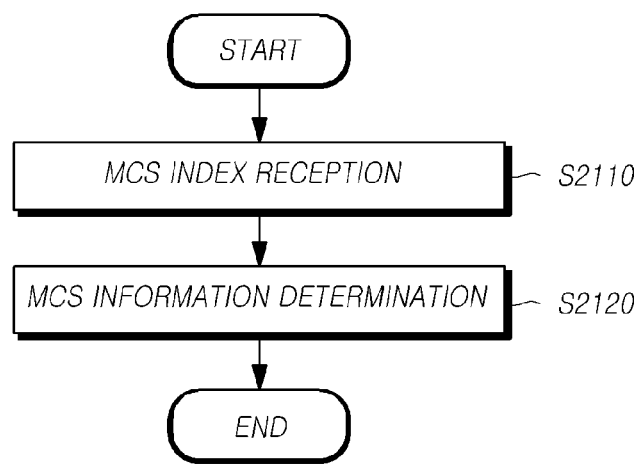
FIG. 12 is a flow chart illustrating a method of a user equipment for receiving control information on a physical data channel according to an embodiment of the present disclosure.

FIG. 12 is a flowchart illustrating a method of a UE for receiving control information on a physical data channel according to an embodiment of the present disclosure.

Referring to FIG. 12, a method of a UE is provided for receiving control information on a physical data channel. The method 1200 includes receiving control information indicating a specific modulation and coding scheme (MCS) index corresponding to modulation and coding scheme (MCS) information on a physical data channel through a physical downlink control channel (S1210), and determining specific MCS information used for the physical data channel using the specific MCS index and one of two or more MCS tables containing modulation order information corresponding to the specific MCS index (S1220). These MCS tables may additionally include a target code rate corresponding to the specific MCS index, which is calculated by the target BLER described above and spectral efficiency.

The physical data channel may be a physical downlink data/shard channel (PDSCH) or a physical uplink data/shard channel (PUSCH).

In the receiving S1210, a DL allocation DCI format and a UL grant DCI format for any UE may include an information area or an information field indicating the specific modulation and coding scheme (MCS) index corresponding to the specific modulation and coding scheme (MCS) information. This information field may be an MCS index field. A format of the physical downlink control channel indicating an MCS index for the physical downlink shard channel and a format of the physical downlink control channel indicating an MCS index for the physical uplink shard channel may be different from each other.

At least one of the two or more MCS tables may be an MCS table based on a higher modulation order including 64QAM or 256QAM, and another of the MCS tables may be an MCS table based on a lower modulation order including QPSK or 16QAM.

For example, in the case of an MCS table optimized for maximizing the transmission rate, such as the eMBB, an MCS table may be configured based on higher order modulation. For example, in the case of an MCS table for reliability-critical data, such as in the URLLC, an MCS table may be configured based on lower order modulation. That is, according to the target BLER values, as a corresponding target BLER is higher, an MCS table having an MCS index may be configured based on a higher order modulation scheme such as 64QAM, 256QAM, or 1024QAM. As a target BLER is lower, another MCS table having an MCS index may be configured based on a lower order modulation scheme such as QPSK, or 16 QAM may be constructed.

A base station may implicitly signal information for selecting one of the two or more MCS tables through DL allocation DCI for the PDSCH and UL grant DCI for the PUSCH. The UE derives one of two or more MCS tables, which have been signaled implicitly, through the DL allocation DCI for the PDSCH and the UL grant DCI for the PUSCH.

One of the two or more MCS tables may be determined by an RNTI value scrambled with a CRC of the physical downlink control channel (PDCCH). The RNTI may be a new MCS-C-RNTI or a new MCS-CS-RNTI that is additionally allocated for the URLLC other than a typical C-RNTI and a typical CS-RNTI.

For example, the information for selecting one of two or more MCS tables may be implicitly determined by a RNTI for PDCCH decoding of the UE. That is, in a case where such a new MCS table for the URLLC is configured for any UE, the base station may allocate a new RNTI for the new MCS table, i.e., an MCS-C-RNTI or an MCS-CS-RNTI through higher layer signaling. The UE may derive information for selecting one of two or more MCS tables based on the new RNTI, i.e., the MCS-C-RNTI or the MCS-CS-RNTI.

Specifically, in addition to scheduling control information based on an MCS table defined for providing the typical eMBB service, i.e., the C-RNTI or the CS-RNTI allocated for UE-specific DL allocation DCI or UL grant DCI transmission/reception, i) scheduling control information may be separately defined based on an MCS table newly defined for the URLLC, i.e., the new RNTI (e.g., the MCS-C-RNTI or the MCS-CS-RNTI) for UE-specific DL allocation DCI or UL grant transmission/reception, and ii) one of two or more MCS tables may be selected based on this newly defined information.

As another method of selecting one of two or more MCS tables, an MCS table to be applied may be selected for each search space configured for any UE.

One of the two or more MCS tables may be determined according to a type of search space through which physical downlink control channel (PDCCH) transmission is performed. The type of search space may be a UE-specific search space.

That is, the MCS table may be implicitly configured based on each search space kind/type (e.g., CS or UE-specific SS) through performing the physical downlink control channel (PDCCH) transmission.

In the determining S1220, the UE determines the specific MCS information using the specific MCS index and one of two or more MCS tables.

For example, when the physical data channel is a physical downlink shard channel (PDSCH), the base station may encode the physical downlink shard channel (PDSCH) based on the specific MCS information. The UE decodes the physical downlink shard channel (PDSCH) based on the specific MCS information.

For example, when the physical data channel is a physical uplink shard channel (PUSCH), the UE encodes the physical uplink shard channel (PDSCH) based on the specific MCS information. The UE transmits this physical uplink shared channel (PUSCH) to the base station. The base station receives this physical uplink shared channel (PUSCH) from the UE.

Figure 13:
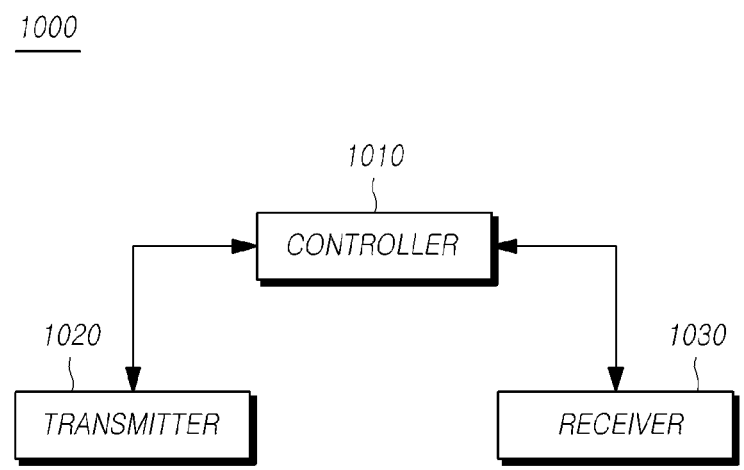
FIG. 13 is a block diagram illustrating a base station according to an embodiment of the present disclosure.

FIG. 13 is a block diagram illustrating a base station according to an embodiment of the present disclosure.

Referring to FIG. 13, a base station 1300 according to an embodiment includes a controller 1310, a transmitter 1320, and a receiver 1330.

The controller 1310 controls the overall operation of the base station 1300 for performing a method in which a separate MCS table is configured for each target BLER, as a method for configuring a MCS and a TBS in the NR required to perform the above-described embodiments of the present discharge.

The transmitter 1320 and the receiver 1330 are used to transmit to and receive, from a UE, signals, messages, and data necessary for carrying out the present disclosure described above.

A UL grant DCI format for the UE may include an information area or an information field indicating a specific modulation and coding scheme (MCS) index corresponding to specific modulation and coding scheme (MCS) information. This information field may be an MCS index field.

At least one of two or more MCS tables may be an MCS table based on a higher modulation order including 64QAM or 256QAM, and another of the MCS tables may be an MCS table based on a lower modulation order including QPSK or 16QAM.

For example, in the case of an MCS table optimized for maximizing the transmission rate, such as the eMBB, an MCS table may be configured based on higher order modulation. For example, in the case of an MCS table for reliability-critical data, such as in the URLLC, an MCS table may be configured based on lower order modulation. That is, according to target BLER values, as a target BLER is higher, an MCS table having an MCS index may be configured based on a higher order modulation scheme such as 64QAM, 256QAM, or 1024QAM. As a target BLER is lower, another MCS table having an MCS index may be configured based on a lower order modulation scheme such as QPSK or 16 QAM.

The base station may implicitly signal information for selecting one of two or more MCS tables through UL grant DCI for a PUSCH.

One of two or more MCS tables may be determined by an RNTI value scrambled with a CRC of a physical downlink control channel (PDCCH). The RNTI may be a new MCS-C-RNTI or a new MCS-CS-RNTI that is additionally allocated for the URLLC other than a typical C-RNTI and a typical CS-RNTI.

For example, the information for selecting one of two or more MCS tables may be implicitly determined by a RNTI for PDCCH decoding of the UE. That is, when such a new MCS table for the URLLC is configured for any UE, a new RNTI for the new MCS table, i.e., an MCS-C-RNTI or an MCS-CS-RNTI may be allocated. The controller 1310 may scramble a CRC of the physical downlink control channel (PDCCH) with the new RNTI, e.g., the MCS-C-RNTI or the MCS-CS-RNTI.

Specifically, in addition to scheduling control information based on an MCS table defined for providing the typical eMBB service, i.e., the C-RNTI or the CS-RNTI allocated for UE-specific DL allocation DCI or UL grant DCI transmission/reception, i) scheduling control information may be separately defined based on an MCS table newly defined for the URLLC, i.e., the new RNTI (e.g., the MCS-C-RNTI or the MCS-CS-RNTI) for UE-specific DL allocation DCI or UL grant transmission/reception, and ii) one of two or more MCS tables may be selected based on this newly defined information.

As another method of selecting one of two or more MCS tables, an MCS table to be applied may be selected for each search space configured for any UE.

One of the two or more MCS tables may be determined by a type of search space through which physical downlink control channel (PDCCH) transmission is performed. The type of search space may be a UE-specific search space.

That is, the MCS table may be implicitly configured by each search space kind/type (e.g., CS or UE-specific SS) through which the physical downlink control channel (PDCCH) transmission is performed.

The receiver S1120 receives the physical uplink shard channel (PUSCH) modulated based on specific MCS information determined using the specific MCS index and one of the two or more MCS tables.

That is, the UE determines the specific MCS information using the specific MCS index and one of two or more MCS tables. The UE encodes the physical uplink shard channel (PUSCH) based on the specific MCS information.

The UE transmits this physical uplink shared channel (PUSCH) to the base station. The receiver 1330 receivers this physical uplink shared channel (PUSCH) from the UE.

Figure 14:
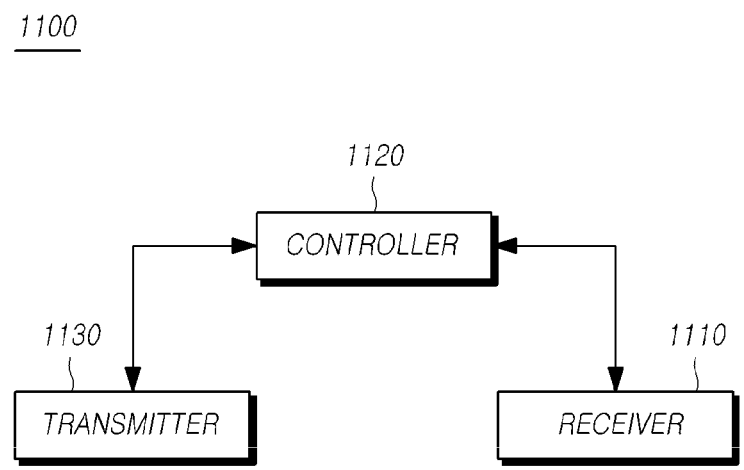
FIG. 14 is a block diagram illustrating a user equipment according to an embodiment of the present disclosure.

FIG. 14 is a block diagram illustrating a UE according to an embodiment of the present disclosure.

Referring to FIG. 14, a UE 1400 according to another embodiment includes a receiver 1410, a controller 1420, and a transmitter 1430.

The receiver 1410 receives downlink control information and data, messages through a corresponding channel from a base station.

The controller 1420 controls the overall operation of the UE 1400 for performing a method in which a separate MCS table is configured for each target BLER, as a method for configuring a MCS and a TBS in the NR required to perform the above-described embodiments of the present discharge.

The transmitter 1430 transmits uplink control information and data, messages through a corresponding channel to the BS.

A physical data channel may be a physical downlink data/shard channel (PDSCH) or a physical uplink data/shard channel (PUSCH).

As described above, a downlink allocation DCI format and an uplink grant DCI format for a UE may include an information area or an information field indicating the specific modulation and coding scheme (MCS) index corresponding to the specific modulation and coding scheme (MCS) information. This information field may be an MCS index field. A format of a physical downlink control channel indicating an MCS index for the physical downlink shard channel and a format of a physical downlink control channel indicating an MCS index for the physical uplink shard channel may be different from each other.

At least one of two or more MCS tables may be an MCS table based on a higher modulation order including 64QAM or 256QAM and another of the MCS tables may be an MCS table based on a lower modulation order including QPSK or 16QAM.

For example, in the case of an MCS table optimized for maximizing the transmission rate, such as the eMBB, an MCS table may be configured based on higher order modulation. For example, in the case of an MCS table for reliability-critical data, such as in the URLLC, an MCS table may be configured based on lower order modulation. That is, according to target BLER values, as a target BLER is higher, an MCS table having an MCS index may be configured based on a higher order modulation scheme such as 64QAM, 256QAM, or 1024QAM. As a target BLER is lower, another MCS table having an MCS index may be configured based on a lower order modulation scheme such as QPSK or 16 QAM.

The base station may implicitly signal information for selecting one of the two or more MCS tables through DL allocation DCI for the PDSCH and UL grant DCI for the PUSCH. The controller 1420 derives one of two or more MCS tables, which have been signaled implicitly, through the DL allocation DCI for the PDSCH and the UL grant DCI for the PUSCH.

One of two or more MCS tables may be determined by an RNTI value scrambled with a CRC of the physical downlink control channel (PDCCH). The RNTI may be a new MCS-C-RNTI or a new MCS-CS-RNTI that is additionally allocated for the URLLC other than a typical C-RNTI and a typical CS-RNTI.

The controller 1420 selects one of two or more MCS tables based on the RNTI value scrambled with the CRC of the physical downlink control channel (PDCCH), i.e., the MCS-C-RNTI or the MCS-CS-RNTI.

For example, information for selecting one of two or more MCS tables may be implicitly determined by a RNTI for PDCCH decoding of the UE. That is, in a case where such a new MCS table for the URLLC is configured for any UE, a new RNTI for the new MCS table, i.e., an MCS-C-RNTI or an MCS-CS-RNTI may be allocated. The controller 1429 may derive information for selecting one of two or more MCS tables based on the new RNTI, i.e., the MCS-C-RNTI or the MCS-CS-RNTI.

Specifically, in addition to scheduling control information based on an MCS table defined for providing the typical eMBB service, i.e., the C-RNTI or the CS-RNTI allocated for UE-specific DL allocation DCI or UL grant DCI transmission/reception, i) scheduling control information may be separately defined based on an MCS table newly defined for the URLLC, i.e., the new RNTI (e.g., the MCS-C-RNTI or the MCS-CS-RNTI) for UE-specific DL allocation DCI or UL grant transmission/reception, and ii) one of two or more MCS tables may be selected based on this newly defined information.

As another method of selecting one of two or more MCS tables, an MCS table to be applied may be selected for each search space configured for any UE.

One of the two or more MCS tables may be determined by a type of search space through which physical downlink control channel (PDCCH) transmission is performed. The type of search space may be a UE-specific search space.

That is, the MCS table may be implicitly configured by each search space kind/type (e.g., CS or UE-specific SS) through which the physical downlink control channel (PDCCH) transmission is performed.

That is, the controller 1420 determines specific MCS information using a specific MCS index and one of two or more MCS tables.

For example, when the physical data channel is a physical downlink shard channel (PDSCH), the base station may encode the physical downlink shard channel (PDSCH) based on the specific MCS information. The controller 1420 decodes the physical downlink shard channel (PDSCH) based on the specific MCS information.

For example, when the physical data channel is the physical uplink shard channel (PUSCH), the UE encodes the physical uplink shard channel (PDSCH) based on the specific MCS information. The transmitter 1430 transmits this physical uplink shared channel (PUSCH) to the base station. The base station receives this physical uplink shared channel (PUSCH) from the UE.

The embodiments described above may be supported by the standard documents disclosed in at least one of the wireless access systems IEEE 802, 3GPP and 3GPP2. That is, the steps, configurations, and parts not described in the present embodiments for clarifying the technical idea may be supported by standard documents described above. In addition, all terms disclosed herein may be described by the standard documents described above.

The embodiments described above may be implemented by various means. For example, the embodiments of the present disclosure may be implemented by hardware, firmware, software, or a combination thereof.

In the case of hardware implementation, the method according to embodiments may be implemented by one or more of application specific integrated circuits (ASICs), digital signal processors (DSPs), digital signal processing devices (DSPDs), programmable logic devices (PLDs) (Field Programmable Gate Arrays), a processor, a controller, a microcontroller, a microprocessor, or the like.

In the case of an implementation by firmware or software, the method according to the embodiments may be implemented in the form of an apparatus, a procedure, or a function for performing the functions or operations described above. The software code may be stored in a memory unit and driven by the processor. The memory may be located inside or outside the processor, and may exchange data with the processor by various well-known means.

The terms "system", "processor", "controller", "component", "module", "interface", "model", "unit", and the like, described above may generally refer to computer-related entity hardware, a combination of hardware and software, software, or software in execution. For example, components described above may be, but are not limited to, a process driven by a processor, a processor, a controller, a control processor, an entity, an execution thread, a program and/or a computer. For example, an application running on a controller, controller or processor can be a component. One or more components can be included within a process and/or thread of execution, and a component can be placed on one system or be disposed on more than one system.

The features, structures, configurations, and effects described in the present disclosure are included in at least one embodiment but are not necessarily limited to a particular embodiment. A person skilled in the art can apply the features, structures, configurations, and effects illustrated in the particular embodiment embodiments to another one or more additional embodiment embodiments by combining or modifying such features, structures, configurations, and effects. It should be understood that all such combinations and modifications are included within the scope of the present disclosure. Accordingly, the embodiments of the present disclosure are intended to be illustrative rather than limiting, and the scope of the present invention is not limited by these embodiments. The scope of protection of the present disclosure is to be construed according to the claims, and all technical ideas within the scope of the claims should be interpreted as being included in the scope of the present invention.

What is claimed is:

1. A method of transmitting control information for a physical data channel by a base station, the method comprising:

determining specific modulation and coding scheme (MCS) information used for the physical data channel; and after determining the specific MCS information, transmitting, through a physical downlink control channel, the control information indicating a specific modulation and coding scheme (MCS) index corresponding to the specific MCS information for the physical data channel, wherein the specific MCS information is determined based on one MCS table from a plurality of MCS tables, wherein the one MCS table comprises modulation order information and a target code rate corresponding to the specific MCS index, wherein the one MCS table is associated with the transmission of the physical downlink control channel in a certain search space, wherein, based on the determined specific MCS information, a transport block is transmitted or received through the physical data channel, wherein, in case that the transport block is made up of N code block groups each grouped with at least one code block, a code block group-based retransmission is performed using a code block group transmission indicator, where N is equal to or greater than 1, wherein the code block group transmission indicator indicates a specific code block group being retransmitted, wherein the one MCS table is configured based on a lower modulation order, which is lower than 256 quadrature amplitude modulation (QAM), wherein the one MCS table is associated with an MCS-C (Cell)-radio network temporary identifier (RNTI) scrambled with a cyclic redundancy check (CRC) of the physical downlink control channel, and wherein the MCS-C-RNTI is a newly defined RNTI for both a physical downlink shared channel and a physical uplink shared channel to use the one MCS table.

2. The method according to claim 1, wherein the MCS-C-RNTI is allocated to a user equipment (UE) through a high layer signaling.

3. The method according to claim 1, wherein the certain search space is a UE-specific search space.

4. A method of receiving control information for a physical data channel by a user equipment (UE), the method comprising:
receiving, through a physical downlink control channel the control information indicating a specific modulation and coding scheme (MCS) index corresponding to specific MCS information for the physical data channel; and
determining the specific MCS information used for the physical data channel using the specific MCS index and one MCS table from a plurality of MCS tables,
wherein the one MCS table comprises modulation carder information and a target code rate corresponding to the specific MCS index,
wherein the one MCS table is associated with the reception of the physical downlink control channel in a certain search space,
wherein, based on the determined specific MCS information, a transport block is transmitted or received through the physical data channel,
wherein, in case that the transport block is made up of N code block groups each grouped with at least one code block, a code block group-based retransmission is performed using a code block group transmission indicator, where N is equal to or greater than 1,
wherein the code block group transmission indicator indicates a specific code block group being retransmitted,
wherein the one MCS table is configured based on a lower modulation order, which is lower than 256 quadrature amplitude modulation (QAM),
wherein the one MCS table is associated with an MCS-C (Cell)-radio network temporary identifier (RNTI) scrambled with a cyclic redundancy check (CRC) of the physical downlink control channel, and
wherein the MCS-C-RNTI is a newly defined RNTI for both a physical downlink shared channel and a physical uplink shared channel to use the one MCS table.

5. The method according to claim 4, wherein the MCS-C-RNTI is allocated by a base station through a high layer signaling.

6. The method according to claim 4, wherein the certain search space is a UE-specific search space.

7. The method according to claim 4, wherein a format of the physical downlink control channel indicating the specific MCS index for the physical downlink shared channel is different from a format of the physical downlink control channel indicating the specific MCS index for the physical uplink shared channel.

8. A user equipment (UE) receiving control information for a physical data channel, the UE comprising:
a receiver configured to receive the control information indicating a specific modulation and coding scheme (MCS) index corresponding to specific MCS information for the physical data channel through a physical downlink control channel; and
a controller configured to determine the specific MCS information used for the physical data channel using the specific MCS index and one MCS table from a plurality of MCS tables,
wherein the one MCS table comprises modulation order information and a target code rate corresponding to the specific MCS index,
wherein the one MCS table is associated with the reception of the physical downlink control channel in a certain search space,
wherein based on the determined specific MCS information, a transport block is transmitted or received through the physical data channel,
wherein in case that the transport block is made up of N code block groups each grouped with at least one code block, a code block group-based retransmission is performed using a code block group transmission indicator, where N is equal to or greater than 1,
wherein the code block group transmission indicator indicates a specific code block group being retransmitted,
wherein the one MCS table is configured based on a lower modulation order, which is lower than 256 quadrature amplitude modulation (QAM),
wherein the one MCS table is associated with an MCS-C (Cell)-radio network temporary identifier (RNTI) scrambled with a cyclic redundancy check (CRC) of the physical downlink control channel, and
wherein the MCS-C-RNTI is a newly defined RNTI for both a physical downlink shared channel and a physical uplink shared channel to use the one MCS table.

9. The UE according to claim 8, wherein the receiver receivers the MCS-C-RNTI from a base station through a high layer signaling.

10. The UE according to claim 8, wherein the certain search space is a UE-specific search space.

11. The UE according to claim 8, wherein a format of the physical downlink control channel indicating the specific MCS index for the physical downlink shared channel and a format of the physical downlink control channel indicating the specific MCS index for the physical uplink shared channel are different from each other.

\* \* \* \* \*